(12) United States Patent
Sirotkin et al.

(10) Patent No.: US 10,045,255 B2
(45) Date of Patent: Aug. 7, 2018

(54) APPARATUS, SYSTEM AND METHOD OF PROCESSING PDCP PDUS OF AN E-RAB

(71) Applicant: INTEL IP CORPORATION, Santa Clara, CA (US)

(72) Inventors: Alexander Sirotkin, Giv'on Hachadasha (IL); Jing Zhu, Portland, OR (US); Nageen Himayat, Fremont, CA (US); Jerome Parron, Fuerth (DE); Penny Efraim-Sagi, Kfar Sava (IL); Martin Kolde, Neubiberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/537,990

(22) PCT Filed: Dec. 24, 2015

(86) PCT No.: PCT/US2015/000335
§ 371 (c)(1),
(2) Date: Jun. 20, 2017

(87) PCT Pub. No.: WO2016/118103
PCT Pub. Date: Jul. 28, 2016

(65) Prior Publication Data
US 2017/0367007 A1    Dec. 21, 2017

Related U.S. Application Data

(60) Provisional application No. 62/105,438, filed on Jan. 20, 2015.

(51) Int. Cl.
*H04W 28/06* (2009.01)
*H04W 72/04* (2009.01)
(Continued)

(52) U.S. Cl.
CPC ......... *H04W 28/06* (2013.01); *H04L 12/4633* (2013.01); *H04W 72/0406* (2013.01);
(Continued)

(58) Field of Classification Search
CPC ..... H04W 84/12; H04W 88/06; H04W 48/12; H04W 72/04; H04W 28/065
See application file for complete search history.

(56) References Cited

U.S. PATENT DOCUMENTS

2011/0090866 A1    4/2011  Yang
2011/0319129 A1   12/2011  Bhat et al.
(Continued)

OTHER PUBLICATIONS

ETSI TS 136 323 V12.2.0 (Feb. 2015); LTE; Evolved Universal Terrestrial Radio Access (E-UTRA); Packet Data Convergence Protocol (PDCP) specification (3GPP TS 36.323 version 12.2.0 Release 12, Feb. 2015, 32 pages.
(Continued)

*Primary Examiner* — Diane Mizrahi
(74) *Attorney, Agent, or Firm* — Shichrur & Co.

(57) ABSTRACT

Some demonstrative embodiments include devices, systems and/or methods of processing Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB). For example, an apparatus may include PDCP processor configured to process a plurality of PDUs of an E-RAB, the PDCP processor configured to apply a sequence of a plurality of PDCP procedures to one or more first PDUs communicated via the cellular link, and to apply no more than a part of the sequence of PDCP procedures, by selecting not to apply one or more of the plurality of PDCP procedures, to one or more second PDUs communicated via a non-cellular Radio Access Technology (RAT).

25 Claims, 9 Drawing Sheets

(51) Int. Cl.
　　　*H04L 12/46*　　　(2006.01)
　　　*H04L 29/06*　　　(2006.01)
　　　*H04W 88/06*　　　(2009.01)
　　　*H04W 88/10*　　　(2009.01)
　　　*H04W 84/12*　　　(2009.01)

(52) U.S. Cl.
　　　CPC ......... *H04L 63/0428* (2013.01); *H04W 84/12* (2013.01); *H04W 88/06* (2013.01); *H04W 88/10* (2013.01)

(56) References Cited

U.S. PATENT DOCUMENTS

| | | | |
|---|---|---|---|
| 2014/0078906 A1 | 3/2014 | Chen et al. | |
| 2014/0369198 A1 | 12/2014 | Rinne et al. | |
| 2015/0215777 A1* | 7/2015 | Sirotkin | H04W 12/04 455/411 |
| 2016/0127422 A1* | 5/2016 | Basavarajappa | H04L 65/1016 455/426.1 |
| 2016/0128110 A1* | 5/2016 | Sirotkin | H04W 76/022 370/329 |
| 2016/0135120 A1* | 5/2016 | Sirotkin | H04W 48/18 370/329 |
| 2016/0366707 A1* | 12/2016 | Sirotkin | H04W 12/02 |
| 2017/0245208 A1* | 8/2017 | Sirotkin | H04W 48/18 |

OTHER PUBLICATIONS

"3GPP TS 36.300 Evolved Universal Terrestrial Radio Access (E-UTRA) and Evolved Universal Terrestrial Radio Access Network (E-UTRAN); and Evolved Universal Terrestrial Radio Access Network (E-UTRAN), Overall description; Stage 2, version 11.7.0 Release 11", Sep. 2013, 209 pages.

3GPP TSG 3rd Generation Partnership Project; Technical Specification Group Radio Access Network; Evolved Universal Terrestrial Radio Access (E-UTRA); Packet Data Convergence Protocol (PDCP) specification (Release 12), 3GPP TS 36.323 V12.2.0, Jan. 5, 2015, 30 pages.

International Search Report and Written Opinion for PCT/US2015/000335, dated Apr. 18, 2016, 10 pages.

International Preliminary Report on Patentability for PCT/US2015/000335, dated Aug. 3, 2017, 7 pages.

\* cited by examiner

APPARATUS, SYSTEM AND METHOD OF PROCESSING PDCP PDUS OF AN E-RAB

CROSS REFERENCE

This application claims the benefit of and priority from U.S. Provisional Patent Application No. 62/105,438 entitled "ENCRYPTION METHOD FOR LTE/WLAN AGGREGATION", filed Jan. 20, 2015, the entire disclosure of which is incorporated herein by reference.

TECHNICAL FIELD

Some embodiments described herein generally relate to processing Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB).

BACKGROUND

A wireless communication device, e.g., a mobile device, may be configured to utilize multiple wireless communication technologies.

For example, a User Equipment (UE) device may be configured to utilize a cellular connection, e.g., a Universal Mobile Telecommunications System (UMTS) cellular connection or a Long Term Evolution (LTE) connection, as well as a wireless-local-area-network (WLAN) connection, e.g., a Wireless-Fidelity (WiFi) connection.

There is a need for efficient interworking, integration and/or management of the cellular and WLAN radio access technologies.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
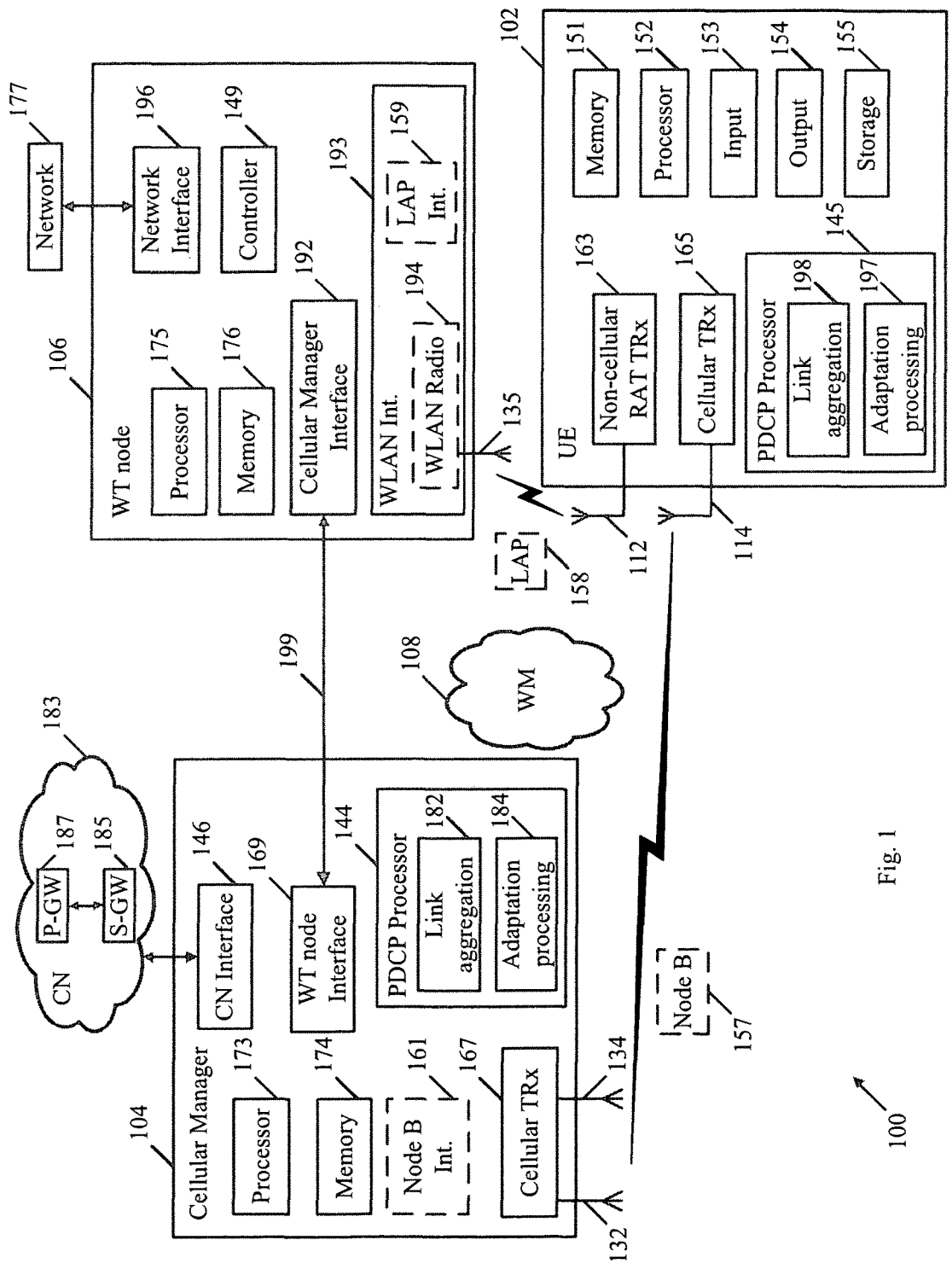
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, an Internet of Things (IoT) device, a sensor device, a wearable device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including 3GPP TS 36.300 ("*TS 36.300 Evolved Universal Terrestrial Radio Access (E-UTRA) and Evolved Universal Terrestrial Radio Access Network (E-UTRAN); Overall description; Stage 2, version 11.7.0 Release 11"*, September 2013); and/or 3GPP TS 0.36.323 (*ETSI TS 136 323 V12.2.0 (2015-02); LTE; Evolved Universal Terrestrial Radio Access (E-UTRA); Packet Data Convergence Protocol (PDCP) specification (3GPP TS 36.323 version 12.2.0 Release 12)*)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012*), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments are described herein with respect to a WLAN system, a WiFi system, and/or a WiGig system. However, other embodiments may be implemented in any other suitable non-cellular network.

Some demonstrative embodiments are described herein with respect to a WLAN Termination (WT) node. However, other embodiments may be implemented in any other WLAN access device and/or WLAN access manager node and/or interface.

Some demonstrative embodiments may be used in conjunction with a Heterogeneous Network (HetNet), which may utilize a deployment of a mix of technologies, frequencies, cell sizes and/or network architectures, e.g., including cellular, millimeter wave ("mmWave" or "mmW"), and/or the like. In one example, the HetNet may include a radio access network having layers of different-sized cells ranging from large macrocells to small cells, for example, picocells and femtocells. Other embodiments may be used in conjunction with any other suitable wireless communication network.

Other embodiments may be used in conjunction with any other suitable wireless communication network.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a WiFi channel, an IR channel, and the like. One or more elements of system 100 may optionally be capable of communicating over any suitable wired communication links.

In some demonstrative embodiments, system 100 may include at least one cellular manager 104 to manage communication of a cellular network, e.g., as described below.

In some demonstrative embodiments, cellular manager 104 may include, may operate as, and/or may perform the functionality of, an Evolved Node B (eNB). For example, cellular manager 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations, communications, and/or functionality.

In other embodiments, cellular manager 104 may include any other functionality and/or may perform the functionality of any other cellular node, network controller, base station or any other node or network device.

In one example, cellular manager 104 may be part of a UMTS. According to this example, cellular manager 104 may perform the functionality of a Radio Network Controller (RNC), which may control a plurality of Node B devices 157. For example, the node B may be configured to communicate directly with UEs, e.g., including UE 102, for example, using a Wideband Code Division Multiple Access (WCDMA) and/or Time Division Synchronous Code Division Multiple Access (TD-SCDMA) air interface technology. The RNC may include, for example, a UMTS RNC configured to control the Node B devices 157.

In some demonstrative embodiments, system 100 may include a WLAN Termination (WT) node 106, which may be configured to terminate a WLAN network interface, e.g., as described herein.

Some demonstrative embodiments are described below with respect to a WT node to terminate a WLAN network interface. In other embodiments and additional or alternative termination node may be used to terminate a network interface of any other non-cellular RAT network, for example, a Bluetooth network, a millimeter wave (mmWave) network, and/or any other network, e.g., in addition to or instead of the WLAN network.

In some demonstrative embodiments, WT node 106 may be configured to manage access to a non-cellular network 107, for example, a WLAN, e.g., a Basic Service Set (BSS).

In some demonstrative embodiments, one or more functionalities of WT node 106 may be implemented, for example, as part of a WLAN access device, for example, as part of a WLAN Access Point (AP), or a WLAN Access Controller (AC), as part of another device, or as a standalone device.

In other embodiments, WT node 106 may include any other functionality and/or may perform the functionality of any other device capable of controlling and/or managing WLAN radio access to one or more wired networks.

In one example, WT bode 106 may include, operate as, and/or perform the functionality of, an AP, e.g., configured to communicate directly with UE 102 via a WLAN link.

In another example, WT bode 106 may include, operate as, and/or perform the functionality of, an AC. According to this example, WT node 106 may control a plurality of AP devices, e.g., including Lightweight Access Point (LAP) devices 158.

In some demonstrative embodiments, UE 102 may include, for example, a Mobile Device (MD), a Station (STA), a mobile computer, a laptop computer, a notebook computer, a tablet computer, an Ultrabook™ computer, an Internet of Things (IoT) device, a wearable device, a sensor device, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, cellular manager 104 and/or WT node 106 may include one or more communication interfaces to perform communication between UE 102, cellular manager 104, WT node 106 and/or with one or more other wireless communication devices, e.g., as described below.

Some demonstrative embodiments include an interface 199 (also referred to as "the access device interface", "the horizontal interface", "the "Xw interface", "the X2-W interface" or "the cellular/WLAN interface"), which may include circuitry and/or logic configured to interface, e.g., directly or indirectly, between a cellular network element, e.g., cellular manager 104, and a WLAN element, e.g., WT node 106, as described in detail below.

In some demonstrative embodiments, interface 199 may be implemented to interface between an eNB and a WT node, e.g., as described below. However, in other embodiments, the cellular/WLAN interface 199 may be implemented to directly interface between any other cellular device and any other WLAN device. In one example, the cellular/WLAN interface 199 may be implemented to directly interface between an eNB and a WLAN AP or WLAN AC. In another example, the cellular/WLAN interface 199 may be implemented to directly interface between a UMTS RNC and a WT node. In another example, the cellular/WLAN interface 199 may be implemented to directly interface between a UMTS RNC and a WLAN AP or AC.

In some demonstrative embodiments, interface 199 may be utilized to enhance and/or increase the efficiency of interworking, integration and/or management of the cellular and WLAN radio access technologies.

In some demonstrative embodiments, interface 199 may be configured to perform and/or support one or more aggregation operations and/or functionalities, for example, to transfer traffic, e.g., in addition to transferring control plane information.

In some demonstrative embodiments, interface 199 may be utilized to improve efficiency of resource management, to provide efficient load balancing, and/or to improve mobility between Radio Access Technology (RAT) networks.

In some demonstrative embodiments, cellular manager 104 may include an interface ("Core Network (CN) interface") 146, e.g., a vertical interface, including circuitry and/or logic configured to communicate with one or more elements of a CN 183, e.g., an Evolved Packet Core (EPC).

In some demonstrative embodiments, CN interface 146 may include an S1 vertical interface configured to communicate between cellular manager 104 and a Serving Gateway (S-GW) 185 according to an S1 protocol, e.g., if cellular manager 104 performs the functionality of an eNB. According to this example, S-GW 187 may interface between cellular manager 104 and a Packet Data Network (PDN) Gateway (P-GW) 187.

In other embodiments, CN interface 146 may include any other vertical interface with one or more elements of CN 183. For example, cellular manger 104 may perform the functionality of an RNC, e.g., in a UMTS system. According to this example, CN interface 146 may include an Interface Unit Circuit Switch (Iu-CS) interface and/or an Interface Unit Packet Switch (Iu-PS) interface, to interface between the RNC and one or more packet-switched or circuit-switched CN elements.

In some demonstrative embodiments, cellular manager 104 may include an interface including circuitry and/or logic to communicate user plane traffic, directly or indirectly, between CN 183 and UE 102.

In some demonstrative embodiments, cellular manager 104 may communicate the user plane traffic directly with UE 102, for example, if cellular manager 104 performs the functionality of an eNB. According to these embodiments, cellular manager 104 may include an air interface, for example, a cellular transceiver (TRx) 167, including circuitry and/or logic configured to communicate with UE 102 via a cellular link.

In other embodiments, cellular manager 104 may communicate the user plane traffic with UE 102 via Node B 157, e.g., if cellular manager 104 performs the functionality of an RNC. According to these embodiments, cellular manager 104 may include a Node B interface 161 to communicate between the RNC and Node B 157. For example, Node B interface 161 may include an Interface Unit b (Iub).

In some demonstrative embodiments, cellular manager 104 may include a WT node interface 169 including circuitry and/or logic configured to communicate with WT node 106, e.g., as described below. In one example, interface 169 may include an AP interface, e.g., if WLAN access device 106 performs the functionality of an AP. In another example, interface 169 may include an AC interface, e.g., if WLAN access device 106 performs the functionality of an AC. In another example, interface 169 may include any other non-cellular RAT interface to communicate with a node of a non-cellular RAT network.

In some demonstrative embodiments, WT node 106 may include a cell manager interface ("the cellular interface") 192 including circuitry and/or logic configured to communicate with cellular manager 104. In one example, interface 192 may include an eNB interface, e.g., if cellular manager 104 performs the functionality of an eNB. In another example, interface 192 may include a RNC interface, e.g., if cellular manager 104 performs the functionality of a RNC.

In some demonstrative embodiments, interfaces 169 and 192 may be configured to communicate between cellular manager 104 and WT node 106 via a direct link of interface 199.

In some demonstrative embodiments, interface 199 may include a Point to Point (P2P) link, e.g., as described below.

In some demonstrative embodiments, interface 199 may be implemented by any wired and/or wireless link, e.g., using any suitable, Physical Layer (PHY) components and/or protocols.

In some demonstrative embodiments, WT node 106 may include a network interface 196 including circuitry and/or logic configured to communicate network traffic with a wired network 177, e.g., the Internet or any other network.

In some demonstrative embodiments, WLAN access device 104 may include a WLAN interface 193 including circuitry and/or logic configured to communicate the network traffic and/or any other traffic with UE 102 via a WLAN, directly or indirectly.

In some demonstrative embodiments, WT node 106 may communicate directly with UE 102 via WLAN link, for example, if WT node 106 operates as, or performs the functionality of, an AP. According to these embodiments, WLAN interface 193 may include a WLAN radio 194 including circuitry and/or logic configured to communicate the network traffic and/or any other traffic directly with UE 102, e.g., via a WLAN link between WT node 106 and UE 102, for example, if WT node 106 operates as, or performs the functionality of, an AP.

In some demonstrative embodiments, WT node 106 may indirectly communicate with UE 102, for example, if WT node 106 performs the functionality of an AC, or if WT node is an entity, which is separate from the WLAN AC or WLAN AP. According to these embodiments, WLAN interface 193 may include, for example, an AP interface, e.g., a LAP interface 159, to communicate the network traffic and/or any other traffic with LAP 158.

In some demonstrative embodiments, WLAN interface 193 may include any other additional or alternative interfaces to directly and/or indirectly communicate via the WLAN.

In some demonstrative embodiments, UE 102 may include a non-cellular RAT transceiver (TRx) 163, for example, a WLAN TRx, including circuitry and/or logic configured to communicate with a WLAN device, e.g., with WT node 106 and/or with LAP 158, via the WLAN link. Some embodiments are described below with respect to a UE, e.g., UE 102, including a WLAN TRx to communicate over a WLAN. In other embodiments, the UE may include any additional or alternative non-cellular RAT TRx, e.g., a Bluetooth TRx and/or any other TRx, to communicate over any additional or alternative non-cellular RAT network.

In some demonstrative embodiments, UE 102 may include a cellular transceiver (TRx) 165 including circuitry and/or logic configured to communicate with a cellular device, e.g., cellular manager 104 and/or Node B 157, via the cellular link.

In some demonstrative embodiments, no-cellular TRx 163, cellular TRx 165, cellular TRx 167 and/or WLAN radio 194 may include one or more wireless transmitters, receivers and/or transceivers including circuitry and/or logic to process, encode, decode, send and/or receive wireless communication signals, RF signals, frames, blocks, transmission streams, packets, messages, data items, and/or data.

In some demonstrative embodiments, WLAN TRx 167 and/or WLAN radio 194 may include one or more wireless receivers (Rx) including circuitry and/or logic to receive wireless communication signals, RF signals, frames, blocks, transmission streams, packets, messages, data items, and/or data; and/or one or more wireless transmitters (Tx) including circuitry and/or logic to send wireless communication signals, RF signals, frames, blocks, transmission streams, packets, messages, data items, and/or data. For example, WLAN TRx 167 and/or WLAN radio 194 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, cellular TRx 167 and/or cellular TRx 165 may include a multiple input multiple output (MIMO) transmitters receivers system (not shown), which may be capable of performing antenna beamforming methods, if desired. In other embodiments, cellular TRx 167 and/or cellular TRx 165 may include any other transmitters and/or receivers.

In some demonstrative embodiments, cellular TRx 167 and/or cellular TRx 165 may include LTE, WCDMA and/or TD-SCDMA modulator and/or demodulator circuitry (not shown) configured to modulate and/or demodulate downlink signals to be communicated over downlink channels, e.g., between cellular manager 104 and UE 102, and/or uplink signals to be communicated over uplink channels, e.g., between UE 102 and cellular manager 104. In other embodiments, cellular TRx 167 and/or cellular TRx 165 may include any other modulators and/or demodulators.

In some demonstrative embodiments, cellular TRx 167 and/or cellular TRx 165 may include a turbo decoder and/or a turbo encoder (not shown) including circuitry and/or logic for encoding and/or decoding data bits into data symbols, if desired. In some demonstrative embodiments, cellular TRx 167 and/or cellular TRx 165 may include OFDM and/or SC-FDMA modulators and/or demodulators (not shown) configured to communicate OFDM signals over downlink (DL) channels, and/or SC-FDMA signals over uplink (UL) channels.

In some demonstrative embodiments, UE 102 may establish a WLAN link with a WLAN AP. For example, non-cellular TRx 163 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from the WLAN AP to the one or more STAs. The uplink may include, for example, a unidirectional link from a STA to the WLAN AP.

In some demonstrative embodiments, UE 102, cellular manager 104, and/or WT node 106, may include, or may be associated with, one or more antennas. In one example, non-cellular TRx 163 and/or cellular TRx 165 may be associated with at least two antennas, e.g., antennas 112 and 114, or any other number of antennas, e.g., one antenna or more than two antennas; cellular TRx 167 may be associated with at least two antennas, e.g., antennas 132 and 134, or any other number of antennas, e.g., one antenna or more than two antennas; and/or WLAN radio 194 may be associated with one or more antennas 135.

In some demonstrative embodiments, antennas 112, 114, 132, 134 and/or 135 may include any type of antennas suitable for transmitting and/or receiving wireless communication signals, blocks, frames, transmission streams, packets, messages and/or data. For example, antennas 112, 114, 132, 134 and/or 135 may include any suitable configuration, structure and/or arrangement of one or more antenna elements, components, units, assemblies and/or arrays. For example, antennas 112, 114, 132, 134 and/or 135 may include a phased array antenna, a dipole antenna, a single element antenna, a set of switched beam antennas, and/or the like.

In some embodiments, antennas 112, 114, 132, 134 and/or 135 may implement transmit and receive functionalities using separate transmit and receive antenna elements. In some embodiments, antennas 112, 114, 132, 134 and/or 135 may implement transmit and receive functionalities using common and/or integrated transmit/receive elements.

In some demonstrative embodiments, cellular manager 104, WT node 106, and/or UE 102 may also include, for example, one or more of a processor, an input unit, an output unit, a memory unit, and/or a storage unit. For example, cellular manager 104 may include a processor 173 and/or a memory 174; WT node 106 may include a processor 175 and/or a memory 176; and/or UE 102 may include a memory 151, a processor 152, an input unit 153, an output unit 154, and/or a storage unit 155. UE 102, cellular manager 104 and/or WT node 106 may optionally include other suitable hardware components and/or software components. In some demonstrative embodiments, some or all of the components of one or more of UE 102, cellular manager 104 and/or WT node 106 may be enclosed in a common housing or packaging, and may be interconnected or operably associated using one or more wired or wireless links. In other embodiments, components of one or more of UE 102, cellular manager 104 and/or WT node 106 may be distributed among multiple or separate devices.

In some demonstrative embodiments, processors 173, 175 and/or 152 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 173 may execute instructions, for example, of an Operating System (OS) of cellular manager 104 and/or of one or more suitable applications; processor 175 may execute instructions of an OS of WT node 106 and/or of one or more suitable applications; and/or processor 152 may execute instructions of an OS of UE 102 and/or of one or more suitable applications.

In some demonstrative embodiments, input unit 153 may include, for example, a keyboard, a keypad, a mouse, a touch-screen, a touch-pad, a track-ball, a stylus, a microphone, or other suitable pointing device or input device. Output unit 154 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 174, 176 and/or 151 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 155 includes, for example, a hard disk drive, a floppy disk drive, a Compact Disk (CD) drive, a CD-ROM drive, a DVD drive, or other suitable removable or non-removable storage units. For example, memory unit 174 may store data processed by cellular manager 104; and/or memory unit 176 may store data processed by WT node 106.

In some demonstrative embodiments, UE 102 may be configured to utilize a cellular connection, e.g., a LTE cellular connection or any other cellular connection, to communicate with cellular manager 104, and a WLAN connection, e.g., a Wireless-Fidelity (WiFi) connection, a mmWave connection, a wireless P2P connection, or any other WLAN, e.g., WiGig, connection, to communicate with a WLAN AP connected to, or implemented by, WT node 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, UE 102 and/or cellular manager 104 may be configured to establish one or more Evolved UMTS Terrestrial Radio Access Network (E-UTRAN) Radio Access Bearers (E-RABs) between UE 102 and S-GW 185, e.g., via cellular manager 104.

In some demonstrative embodiments, UE 102, cellular manager 104 and/or WT node 106 may be configured to communicate according to a LTE/WLAN protocol aggregation scheme, e.g., as described below.

In some demonstrative embodiments, the LTE/WLAN protocol stack aggregation may be configured to enable LTE interworking with a WLAN protocol stack.

In some demonstrative embodiments, the LTE/WLAN protocol stack aggregation may be configured to anchor WLAN mobility at the cellular manager 104.

In some demonstrative embodiments, cellular manager 104 and/or WT node 106 may be configured according to a network architecture of a non-collocated LTE/WLAN aggregation, e.g., in which cellular manager 104 and WT node 106 are not collocated as part of an integrated device and/or in which interface 199 is not an internal interface.

In some demonstrative embodiments, cellular manager 104 and/or WT node 106 may be configured according to a network architecture of a collocated LTE/WLAN aggregation, e.g., in which cellular manager 104 and WT node 106 may be collocated as part of an integrated device and/or in which interface 199 is an internal interface.

In some demonstrative embodiments, cellular manager 104 and/or WT node 106 may be configured to communicate in accordance with a dual connectivity (DC) architecture for split bearers, e.g., as described below.

In some demonstrative embodiments, the DC architecture may be configured to enable cellular manager 104 to send packets belonging to a single bearer either directly to UE 102 or via WT node 106.

In some demonstrative embodiments, the DC architecture may be configured to support packets in the form of PDCP PDUs.

In other embodiments, cellular manager 104 and/or WT node 106 may be configured to communicate in accordance with any other additional or alternative architecture.

In some demonstrative embodiments, UE 102, cellular manager 104 and/or WT node 106 may be configured to communicate according to a RAN anchored WLAN architecture, for example, utilizing an interface ("the yy interface") to communicate traffic via a P2P link between UE 102 and cellular manager 104 via WT node 106.

In some demonstrative embodiments, one consideration for designing the LTE/WLAN protocol stack aggregation may be a layer on the protocol stack at which "bearer splitting" of a Data Radio Bearer (DRB) is to be performed, e.g., over both WLAN and LTE. For example, bearer splitting may be performed, above the PDCP layer, below the PDCP layer, or below a Radio Link Control (RLC) layer.

In some demonstrative embodiments, UE 102 and/or cellular manager 104 may be configured to support bearer splitting within the PDCP layer, e.g., as described below.

In some demonstrative embodiments, performing the bearer split within the PDCP layer may be advantageous, for example, at least in terms of reduced UE implementation complexity.

In some demonstrative embodiments, UE 102 and/or cellular manager 104 may be configured to selectively apply one or more PDCP procedures, for example, by selecting to apply the one or more PDCP procedures to one or more Protocol Data Units (PDUs) communicated via a cellular link, while selecting not to apply the one or more PDCP procedures to one or more PDUs communicated via a non-cellular RAT, e.g., as described below.

In some demonstrative embodiments, the one or more PDCP procedures may include one or more ciphering procedures, for example, encryption procedures, e.g., as described below.

In some demonstrative embodiments, the one or more PDCP procedures may include a sequence numbering procedure, e.g., as described below.

In some demonstrative embodiments, the one or more PDCP procedures may include a header compression procedure, e.g., as described below.

In some demonstrative embodiments, the one or more PDCP procedures may include an integrity protection procedure, e.g., as described below.

In some demonstrative embodiments, the one or more PDCP procedures may include a PDCP header insertion procedure, e.g., as described below.

In some demonstrative embodiments, the one or more PDCP procedures may include any other additional or alternative procedures.

In some demonstrative embodiments, a WLAN security method for LTE/WLAN aggregation may include a PDCP based security method with open-mode WLAN security, e.g., no WLAN security. According to this WLAN security method the WLAN may operate in an open-mode, e.g., without any security, and encryption may be implemented in the PDCP layer with encrypted PDCP PDUs sent over the WLAN link. Another WLAN security method may include a WLAN Extensible Authentication Protocol (EAP) based security, with EAP keys derived from LTE keys.

In some demonstrative embodiments, the PDCP based security method may utilize a LTE/WLAN protocol split below the PDCP layer, for example, to allow to re-using mechanisms defined for LTE dual connectivity. However, since according to this method the WLAN is to operate in the open-mode, a message integrity code (MIC) cannot be used to protect MAC header integrity, which may reduce WLAN security. Additionally, from a UE implementation perspective, using PDCP encryption for frames sent via the WLAN link may be relatively complex.

In some demonstrative embodiments, cellular manager 104 and/or 102 may be configured to implement a WLAN security mechanism for LTE/WLAN aggregation, which may at least partially address and/or solve at least one or more of these issues.

In some demonstrative embodiments, the WLAN security mechanism may be configured to perform a protocol split below PDCP, while the PDCP layer may be configured to selectively send PDCP PDUs of a bearer over WLAN without encryption, and to send PDUs of the same bearer sent over the cellular link with encryption, e.g., according to a normal PDCP operation.

In some demonstrative embodiments, the WLAN security mechanism may be configured to support normal WLAN encryption, for example, based on keys derived from cellular keys, e.g., LTE keys.

In some demonstrative embodiments, the PDCP protocol split may be implemented, in a way, which may allow, for example, at least re-using dual connectivity framework for LTE/WLAN aggregation, while security issues, e.g., WLAN MAC integrity protection and/or UE implementation complexity, may be efficiently addressed.

In some demonstrative embodiments, the WLAN security mechanism may provide, for example, at least significant benefits for UE vendors, e.g., by enabling to reduce UE complexity; and/or support implementing LTE/WLAN aggregation, e.g., even with separate LTE and WLAN units or chips.

In some demonstrative embodiments, cellular manager 104 may include a PDCP processor 144 configured to process PDUs of an E-RAB, e.g., as described below.

In some demonstrative embodiments, PDCP processor 144 may be configured to process downlink PDUs of the E-RAB, e.g., PDUs to be transmitted to UE 102; and/or uplink PDUs of the E-RAB, e.g., PDUs received from UE 102.

In some demonstrative embodiments, UE 102 may include a PDCP processor 145 configured to process PDUs of the E-RAB, e.g., as described below.

In some demonstrative embodiments, PDCP processor 145 may be configured to process downlink PDUs of the E-RAB, e.g., PDUs received from cellular manager 104; and/or uplink PDUs of the E-RAB, e.g., PDUs to be transmitted to cellular manager 104.

In some demonstrative embodiments, PDCP processor 144 and/or PDCP processor 145 may include, or may be implemented, using suitable circuitry and/or logic, e.g., controller circuitry and/or logic, scheduler circuitry and/or logic, processor circuitry and/or logic, memory circuitry and/or logic, and/or any other circuitry and/or logic, which may be configured to perform at least part of the functionality of PDCP processor 144 and/or PDCP processor 145. Additionally or alternatively, one or more functionalities of PDCP processor 144 and/or PDCP processor 145 may be implemented by logic, which may be executed by a machine and/or one or more processors, e.g., as described below.

In some demonstrative embodiments, at least part of the functionality of PDCP processor 144 may be implemented by an integrated circuit, for example, a chip, e.g., a System on Chip (SoC). In one example, the chip or SoC may be configured to perform one or more functionalities of cellular transceiver 167 and/or WT node interface 169. For example, the chip or SoC may include one or more elements of PDCP processor 144, and/or one or more elements of cellular transceiver 167 and/or WT node interface 169. In one example, PDCP processor 144, cellular transceiver 167, and WT node interface 169 may be implemented as part of the chip or SoC.

In other embodiments, PDCP processor 144, cellular transceiver 167 and/or WT node interface 169 may be implemented by one or more additional or alternative elements of cellular manager 104.

In some demonstrative embodiments, at least part of the functionality of PDCP processor 145 may be implemented by an integrated circuit, for example, a chip, e.g., a SoC. In one example, the chip or SoC may be configured to perform one or more functionalities of cellular transceiver cellular TRx 165 and/or non-cellular RAT TRx 163. For example, the chip or SoC may include one or more elements of PDCP processor 145, and/or one or more elements of cellular TRx 165 and/or non-cellular RAT TRx 163. In one example, PDCP processor 145, cellular TRx 165 and/or non-cellular RAT TRx 163 may be implemented as part of the chip or SoC.

In other embodiments, PDCP processor 145, cellular TRx 165 and/or non-cellular RAT TRx 163 may be implemented by one or more additional or alternative elements of UE 102.

In some demonstrative embodiments, PDCP processor 144 may be configured to process a plurality of PDUs of an E-RAB, for example, to communicate data between UE 102 and CN 183.

In some demonstrative embodiments, PDCP processor 144 may be configured to apply a sequence of a plurality of PDCP procedures to one or more first downlink PDUs to be transmitted to UE 102 via a cellular link, e.g., as described below. For example, cellular TRx 167 may be configured to transmit the first downlink PDUs to UE 102 via the cellular link between cellular manager 104 ands UE 102.

In some demonstrative embodiments, PDCP processor 144 may be configured to apply only some of the PDCP procedures, for example, by applying no more than a part of the sequence of PDCP procedures, e.g., by selecting not to apply one or more of the plurality of PDCP procedures, to one or more second downlink PDUs to be transmitted to UE 102 via a non-cellular Radio Access Technology (RAT).

In one example, WT node interface 169 may be configured to send the second downlink PDUs to UE 102 via WT node 106.

In another example, cellular manager 104 may include a WLAN UE interface configured to send the second downlink PDUs to UE 102 via a WLAN link. For example, cellular manager 104 and WT node 106 may be collocated as part of an integrated device, which may include WLAN interface 193 to communicate with UE 102.

In some demonstrative embodiments, the sequence of PDCP procedures may include at least a sequence numbering procedure, a header compression procedure, an integrity protection procedure, a ciphering procedure, and/or a PDCP header addition procedure, e.g., as described below. The sequence of PDCP procedures may include any other additional or alternative procedures.

In some demonstrative embodiments, the sequence of PDCP procedures may include a ciphering procedure, e.g., as described below.

In some demonstrative embodiments, PDCP processor 144 may be configured to select not to apply the ciphering procedure to the second downlink PDUs, e.g., as described below.

In some demonstrative embodiments, PDCP processor 144 may be configured to generate one or more encrypted PDCP PDUs based on the one or more first downlink PDUs, and to generate one or more unencrypted PDCP PDUs based on the one or more second downlink PDUs, e.g., as described below.

In some demonstrative embodiments, PDCP processor 144 may include a link aggregation processing module or component 182 configured to receive a PDU of the plurality of downlink PDUs before a PDCP procedure of the plurality of PDCP procedures, e.g., as described below.

In some demonstrative embodiments, link aggregation processing module 182 may be configured to transfer the PDU to be processed by the PDCP procedure, for example, if the PDU is to be transmitted via the cellular link; or to provide a PDCP PDU, which is not processed by the PDCP procedure, for example if the PDU is to be transmitted via the non-cellular RAT, e.g., as described below.

In some demonstrative embodiments, link aggregation processing module 182 may be configured to generate the PDCP PDU including a Link-Aggregation Sequence Number (LA-SN) in a PDCP header of the PDCP PDU, e.g., as described below.

In some demonstrative embodiments, cellular manager 104 may include an adaptation processing module, or component 184 configured to encapsulate the PDCP PDU in a tunneling packet to be tunneled via a link of the non-cellular RAT, e.g., as described below.

In some demonstrative embodiments, cellular manager 104 may be configured to trigger the air interface, e.g., cellular TRx 167, to send to UE a message, e.g., a Radio Resource Control (RRC) message, including an indication of the one or more PDCP procedures, which are not to be applied to the second downlink PDUs, for example, to enable UE 102 to process the second downlink PDUs, e.g., as described below.

In some demonstrative embodiments, cellular manager 104 may send the message including the indication of the one or more PDCP procedures, which are not to be applied to the second downlink PDUs, for example, when setting up a link aggregation.

In some demonstrative embodiments, the message may include an indication of which Link Aggregation TX/RX components are to be operated.

In some demonstrative embodiments, the RRC message may include a "Link Aggregation Mode" parameter configured to have a value to indicate a stage or location at which the Tx/Rx link aggregation is to be implemented, e.g., as follows:
  0: above PDCP "Sequence Numbering/In-order Delivery"
  1: below PDCP "Adding/Removing PDCP header"
  2: below "Header Compression/Decompression" and above "Ciphering/Deciphering"

In some demonstrative embodiments, any additional or alternative values, fields, and/or message formats may be used.

In some demonstrative embodiments, cellular transceiver 165 may receive from the cellular network the one or more first downlink PDCP PDUs of the E-RAB, e.g., as transmitted from cellular manager 104.

In some demonstrative embodiments, non-cellular RAT transceiver 163 may receive the one or more second downlink PDCP PDUs of the E-RAB via the non-cellular RAT link, e.g., from WT node 106.

In some demonstrative embodiments, PDCP processor 145 may be configured to apply the sequence of a plurality of PDCP procedures to the first downlink PDCP PDUs, and to apply no more than a part of the sequence of PDCP procedures, by selecting not to apply one or more of the plurality of PDCP procedures, to the second downlink PDCP PDUs, e.g., as described below.

In some demonstrative embodiments, PDCP processor 145 may be configured to determine the one or more PDCP procedures, which are not to be applied to the to the second downlink PDCP PDUs, for example, based on the indication in the message, e.g., in the RRC message, received by cellular transceiver 165, e.g., from cellular node 104.

In some demonstrative embodiments, PDCP processor 145 may be configured to select not to apply a deciphering procedure to the second downlink PDCP PDUs. For example, the first downlink PDCP PDUs may include encrypted PDCP PDUs, and the second downlink PDCP PDUs may include unencrypted PDCP PDUs, e.g., as described below.

In some demonstrative embodiments, PDCP processor 145 may include a link aggregation processing module or component 198 configured to receive a first PDCP PDU of the first downlink PDCP PDUs processed by the one or more of the plurality of PDCP procedures, to receive a second PDCP PDU of the second downlink PDCP PDUs, which is not processed by the one or more of the plurality of PDCP procedures, and to output the first and second PDCP PDUs according to a reordering scheme, e.g., as described below.

In some demonstrative embodiments, link aggregation processing module 198 may be configured to output the first and second PDCP PDUs to a PDCP procedure after the one or more of the plurality of PDCP procedures, e.g., as described below.

In some demonstrative embodiments, link aggregation processing module 198 may be configured to reorder the first and second PDCP PDUs according to a first Link-Aggregation Sequence Number (LA-SN) in a PDCP header of the first PDCP PDU and a second LA-SN in a header of the second PDCP PDU, e.g., as described below.

In some demonstrative embodiments, UE 102 may include an adaptation processing module or component 197 configured to decapsulate the second PDCP PDU from a tunneling packet received via the non-cellular RAT link, e.g., as described below.

In some demonstrative embodiments, PDCP processor 145 may be configured to process a plurality of uplink PDUs of the E-RAB, e.g., to be communicated from UE 102 to cellular manager 104, e.g., as described below.

In some demonstrative embodiments, PDCP processor 145 may be configured to apply a sequence of a plurality of PDCP procedures to one or more first uplink PDUs to be transmitted to cellular manager 104, for example, via the cellular link, e.g., as described below.

In some demonstrative embodiments, PDCP processor 145 may be configured to apply no more than a part of the sequence of PDCP procedures, by selecting not to apply one or more of the plurality of PDCP procedures, to one or more second uplink PDUs to be sent to the cellular manager 104 via the non-cellular RAT link, for example, via WT node 106, e.g., as described below.

In some demonstrative embodiments, PDCP processor 145 may be configured to determine the one or more PDCP procedures, which are not to be applied to the to the second uplink PDCP PDUs, for example, based on the indication in the message, e.g., in the RRC message, received by cellular transceiver 165, e.g., from cellular node 104.

In other demonstrative embodiments, UE 102 may be configured to send to cellular manager 104 a message to indicate the one or more PDCP procedures, which are not to be applied to the to the second uplink PDCP PDUs.

In some demonstrative embodiments, the sequence of PDCP procedures may include at least a sequence numbering procedure, a header compression procedure, an integrity protection procedure, a ciphering procedure, and/or a PDCP header addition procedure, e.g., as described below. The sequence of PDCP procedures may include any other additional or alternative procedures.

In some demonstrative embodiments, the sequence of PDCP procedures may include a ciphering procedure, e.g., as described below.

In some demonstrative embodiments, PDCP processor 145 may be configured to select not to apply the ciphering procedure to the second uplink PDUs, e.g., as described below.

In some demonstrative embodiments, PDCP processor 145 may be configured to generate one or more encrypted PDCP PDUs based on the one or more first uplink PDUs, and to generate one or more unencrypted PDCP PDUs based on the one or more second uplink PDUs, e.g., as described below.

In some demonstrative embodiments, link aggregation processing module 198 may be configured to receive a PDU of the plurality of uplink PDUs before a PDCP procedure of the plurality of PDCP procedures, e.g., as described below.

In some demonstrative embodiments, link aggregation processing module 198 may be configured to transfer the PDU to be processed by the PDCP procedure, for example, if the PDU is to be transmitted via the cellular link; or to provide a PDCP PDU, which is not processed by the PDCP procedure, for example if the PDU is to be transmitted via the non-cellular RAT, e.g., as described below.

In some demonstrative embodiments, link aggregation processing module 198 may be configured to generate the PDCP PDU including a LA-SN in a PDCP header of the PDCP PDU, e.g., as described below.

In some demonstrative embodiments, adaptation processing module 197 may be configured to encapsulate the PDCP PDU in a tunneling packet to be tunneled via a link of the non-cellular RAT, e.g., as described below.

In some demonstrative embodiments, cellular transceiver 167 may receive from UE 102 the one or more first uplink PDCP PDUs of the E-RAB.

In some demonstrative embodiments, a non-cellular RAT interface of cellular manager 104, for example, WT node interface 169, e.g., in a non-collocated implementation, or WLAN interface 193, e.g., in a collocated implementation, may receive the one or more second uplink PDCP PDUs of the E-RAB via the non-cellular RAT link.

In some demonstrative embodiments, PDCP processor 144 may be configured to apply the sequence of the plurality of PDCP procedures to the first uplink PDCP PDUs, and to apply no more than a part of the sequence of PDCP procedures, by selecting not to apply one or more of the plurality of PDCP procedures, to the second uplink PDCP PDUs, e.g., as described below.

In some demonstrative embodiments, PDCP processor 144 may be configured to determine the one or more PDCP procedures, which are not to be applied to the to the second uplink PDCP PDUs, for example, based on the indication in the message sent to UE 102.

In some demonstrative embodiments, PDCP processor 144 may be configured to determine the one or more PDCP procedures, which are not to be applied to the to the second uplink PDCP PDUs, for example, based on the indication in the message, e.g., received by cellular transceiver 167, e.g., from UE 102.

In some demonstrative embodiments, PDCP processor 144 may be configured to select not to apply a deciphering procedure to the second uplink PDCP PDUs. For example, the first uplink PDCP PDUs may include encrypted PDCP PDUs, and the second uplink PDCP PDUs may include unencrypted PDCP PDUs, e.g., as described below.

In some demonstrative embodiments, link aggregation processing module 182 may be configured to receive a first PDCP PDU of the first uplink PDCP PDUs processed by the one or more of the plurality of PDCP procedures, to receive a second PDCP PDU of the second uplink PDCP PDUs, which is not processed by the one or more of the plurality of PDCP procedures, and to output the first and second PDCP PDUs according to a reordering scheme, e.g., as described below.

In some demonstrative embodiments, link aggregation processing module 182 may be configured to output the first and second PDCP PDUs to a PDCP procedure after the one or more of the plurality of PDCP procedures, e.g., as described below.

In some demonstrative embodiments, link aggregation processing module 182 may be configured to reorder the first and second PDCP PDUs according to a first LA-SN in a PDCP header of the first PDCP PDU and a second LA-SN in a header of the second PDCP PDU, e.g., as described below.

In some demonstrative embodiments, adaptation processing module 184 may be configured to decapsulate the second PDCP PDU from a tunneling packet received via the non-cellular RAT link, e.g., as described below.

Some demonstrative embodiments are described herein with reference to link aggregation using a WLAN RAT, for example, with respect to implementing a flexible PDCP on the LTE and WLAN sides. However, other embodiments may be implemented with respect to any other additional or alternative non-cellular RAT, for example, to aggregate multiple additional or alternative RATs, e.g., including mm-wave, Blue-tooth, and the like.

In some demonstrative embodiments, the flexible PDCP approach described herein may address, for example, at least particular requirements of the additional RATs being aggregated. For example, the WLAN RAT may reuse WLAN security features, rather than relying on LTE ciphering.

Figure 2:
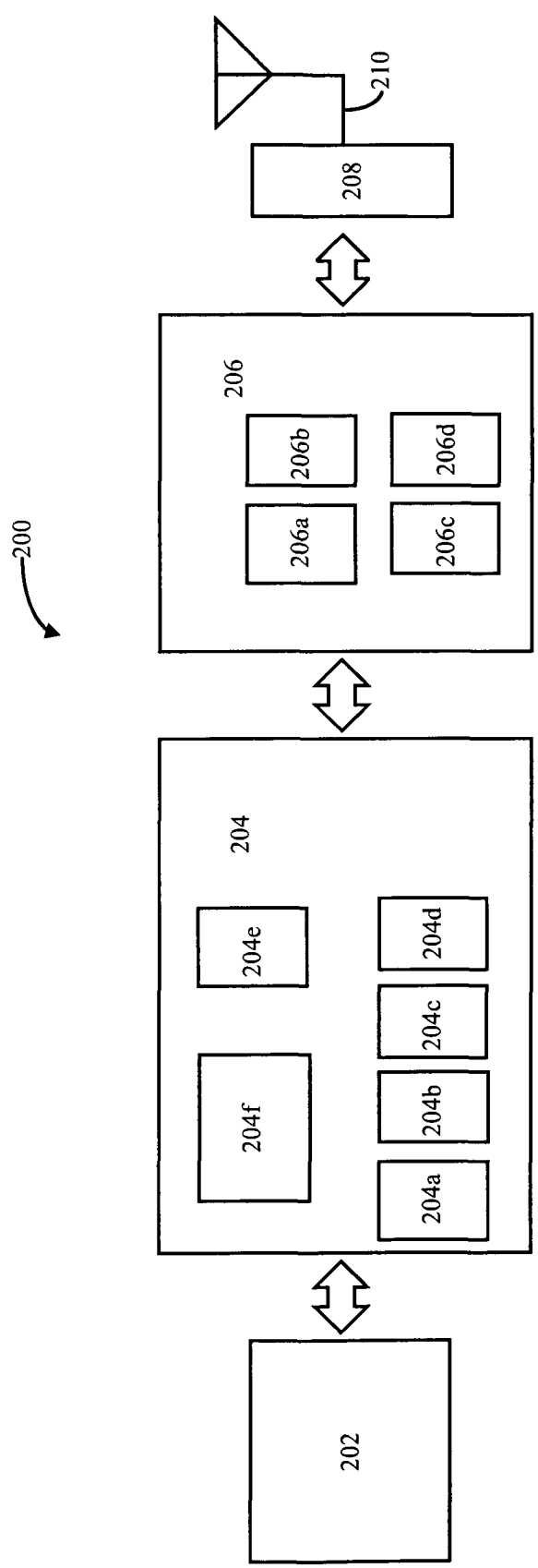
FIG. 2 is a schematic illustration of elements of a User Equipment (UE), in accordance with some demonstrative embodiments.

Reference is made to FIG. 2, which schematically illustrates elements of a UE device 200, in accordance with some demonstrative embodiments. For example, one or more elements of UE device 200 may perform the functionality of one or more elements of UE 102 (FIG. 1). In one example, one or more elements of UE device 200 may be configured to perform the functionality of one or more of cellular TRx 165 (FIG. 1), no-cellular RAT TRx 163 (FIG. 1), PDCP processor 145 (FIG. 1), and/or one or more other elements of UE 102 (FIG. 1). In some demonstrative embodiments, embodiments of a UE may be implemented into a system using any suitably configured hardware and/or software. FIG. 2 illustrates, for one embodiment, example components of UE device 200.

In some demonstrative embodiments, UE device 200 may include application circuitry 202, baseband circuitry 204, Radio Frequency (RF) circuitry 206, front-end module (FEM) circuitry 208, and one or more antennas 210, coupled together at least as shown.

In one example, application circuitry 202 may be configured to perform at least part of the functionality of PDCP processor 145 (FIG. 1); and/or baseband circuitry 204, RF circuitry 206, and/or FEM circuitry 208 may be configured to perform at least part of the functionality of cellular TRx 165 (FIG. 1), non-cellular RAT TRx 163 (FIG. 1), and/or PDCP processor 145 (FIG. 1).

In some demonstrative embodiments, the application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

In some demonstrative embodiments, the baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202, for example, for generation and processing of the baseband signals and for controlling operations of the RF circuitry 206. For example, in some embodiments, the baseband circuitry 204 may include a second generation (2G) baseband processor 204a, a third generation (3G) baseband processor 204b, a fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some demonstrative embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured, for example, to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation, and/or may include other suitable processing elements in other embodiments. Components of the baseband circuitry 204 may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some demonstrative embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN), and/or one or more additional or alternative networks. Embodiments in which the baseband circuitry 204 is configured to support radio communications of more than one wireless protocol may be referred to as multi-mode baseband circuitry.

In some demonstrative embodiments, RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208, and to provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some demonstrative embodiments, the RF circuitry 206 may include a receive signal path and a transmit signal path. The receive signal path of the RF circuitry 206 may include mixer circuitry 206a, amplifier circuitry 206b, and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be, for example, a low-pass filter (LPF) or a band-pass filter (BPF), configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some demonstrative embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some demonstrative embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some demonstrative embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry, and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some demonstrative embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

In some demonstrative embodiments, the synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some demonstrative embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

In some demonstrative embodiments, synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some demonstrative embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

In some demonstrative embodiments, FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some demonstrative embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE device 200 may include one or more additional or alternative elements such as, for example, memory/storage, display, camera, sensor, and/or input/output (I/O) interface.

Figure 3:
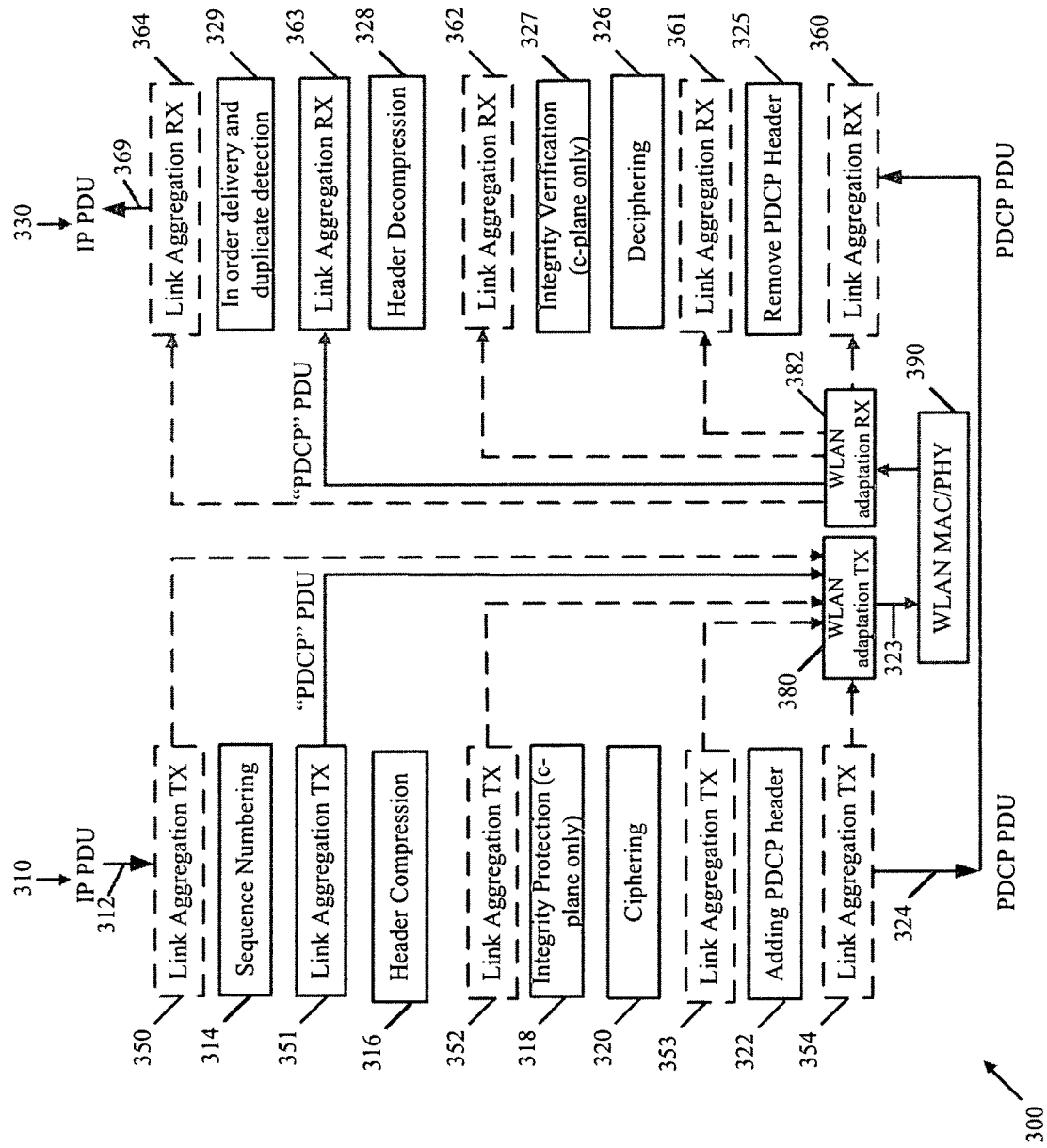
FIG. 3 is a schematic illustration of a Packet Data Convergence Protocol (PDCP) Protocol stack, in accordance with some demonstrative embodiments.

Reference is now made to FIG. 3, which schematically illustrates a PDCP Protocol stack 300, in accordance with some demonstrative embodiments. For example, one or more elements of PDCP protocol stack 300 may be implemented by PDCP processor 144 and/or PDCP processor 145 (FIG. 1).

In some demonstrative embodiments, PDCP protocol stack 300 may be configured to handle bearer splitting and/or link aggregation within the PDCP layer, for example, in a 3GPP RAN-anchored WLAN architecture and/or any other architecture, e.g., as described below.

In some demonstrative embodiments, PDCP protocol stack 300 may be configured to support WLAN/3GPP link aggregation within the PDCP layer, e.g., as described below.

In some demonstrative embodiments, PDCP protocol stack 300 may be configured to provide a user plane (u-plane) mechanism configured to support bearer splitting, e.g., in a RAN-based WLAN/3GPP integrated network and/or any other network, for example, with a reduced level of UE implementation complexity.

In some demonstrative embodiments, a Transmit (Tx) side 310 of PDCP protocol stack 300 may be configured to apply one or more PDCP procedures to one or more PDUs 312, e.g., Internet Protocol (IP) PDUs, to be transmitted to a Receive (Rx) side 330.

In some demonstrative embodiments, PDCP processor 144 (FIG. 1) may be configured to implement one or more operations, functionalities and/or components of Tx side 310, for example, to process downlink PDUs to be transmitted from cellular manager 104 (FIG. 1) to UE 102 (FIG. 1), e.g., as described above.

In some demonstrative embodiments, PDCP processor 145 (FIG. 1) may be configured to implement one or more operations, functionalities and/or components of Tx side 310, for example, to process uplink PDUs to be transmitted from UE 102 (FIG. 1) to cellular manager 104 (FIG. 1), e.g., as described above.

In some demonstrative embodiments, the Tx side 310 of PDCP protocol stack 300 may include a plurality of PDCP processing components to apply a sequence of PDCP processes to PDUs 312.

In some demonstrative embodiments, the Tx side 310 of PDCP protocol stack 300 may include, for example, at least a sequence numbering component 314 configured to apply a sequence numbering procedure, a header compression component 316 configured to apply a header compression procedure, an integrity protection component 318 configured to apply a integrity protection procedure, a ciphering component 320 configured to apply a ciphering procedure, and/or a PDCP header adder component 322 configured to apply a PDCP header addition procedure, e.g., as described below. The Tx side 310 of PDCP protocol stack 300 may include any other additional or alternative component configured to apply any additional or alternative procedures.

In some demonstrative embodiments, the Tx side 310 of PDCP protocol stack 300 may be configured to generate one or more PDCP PDUs 324 corresponding to one or more first PDUs of the PDUs 312, for example, by applying the sequence of PDCP procedures, e.g., by all components of Tx side 310, to the one or more first PDUs.

In some demonstrative embodiments, the PDCP PDUs 324 may be transmitted to the Rx side 330 via a cellular link, e.g., the cellular uplink or downlink between UE 102 (FIG. 1) and cellular manager 104 (FIG. 1).

In some demonstrative embodiments, the Tx side 310 of PDCP protocol stack 300 may be configured to select not to apply one or more of the PDCP procedures, e.g., to apply only some of the PDCP procedures, to one or more second PDUs of PDUs 312, e.g., as described below.

In some demonstrative embodiments, the Tx side 310 of PDCP protocol stack 300 may include at least one link aggregation processing module or component (also referred to as "Tx link aggregation module"), which may be configured to receive a PDU before a PDCP procedure of the plurality of PDCP procedures, and to selectively transfer the PDU to be processed by the PDCP procedure, for example, based on whether the PDU is to be communicated via the cellular link or the non-cellular RAT link, e.g., as described below.

In some demonstrative embodiments, the Tx link aggregation module may be configured to transfer the PDU to be processed by the PDCP procedure, for example, if the PDU is to be transmitted via the cellular link, e.g., as described below.

In some demonstrative embodiments, the Tx link aggregation module may be configured to provide a PDCP PDU, which is not processed by the PDCP procedure, for example if the PDU is to be transmitted via the non-cellular RAT, e.g., as described below.

In some demonstrative embodiments, the at least one Tx link aggregation module may be implemented to operate at one or more different stages and/or locations within the PDCP stack, for example, depending on which PDCP procedure is to be shared and/or reused across 3GPP and WLAN, e.g., as described below.

In some demonstrative embodiments, the Tx side 310 of PDCP protocol stack 300 may include at least one of a Tx link aggregation module 350, for example, to handle PDUs prior to sequence numbering component 314; a Tx link aggregation module 351 for example, to handle PDUs prior to header compression component 316; a Tx link aggregation module 352, for example, to handle PDUs prior to integrity protection component 318 and/or ciphering component 320; a Tx link aggregation module 353, for example, to handle PDUs prior to PDCP header addition component 322; and/or a Tx link aggregation module 354, for example, to handle PDUs after PDCP header addition component 322.

In some demonstrative embodiments, Tx link aggregation modules 350, 351, 352, 353, and/or 354 may be configured to split a bearer, e.g., E-RAB, over WLAN and LTE. In some cases and/or implementations, the bearer may be delivered, for example, solely over WLAN or LTE. Such cases may be considered, for example, as a special case of "bearer splitting", e.g., wherein no splitting is performed.

In some demonstrative embodiments, Tx link aggregation modules 350, 351, 352, 353, and/or 354 may be configured to receive packets, e.g., PDUs, for example, from an upper PDCP function or from the input of PDUs 312, and to split the traffic of the packets such that some packets will continue to a lower PDCP function and to transmission over the cellular link, while other packets will be offloaded to WLAN.

In some demonstrative embodiments, Tx link aggregation modules 350, 351, 352, 353, and/or 354 may be configured to select which packets are to be transferred to be processed by the lower PDCP function, and which packets are to be offloaded to WLAN, for example, based on input from a Radio Resource Management (RRM) component, e.g., of cellular manager 104 (FIG. 1).

In some demonstrative embodiments, the Tx side 310 of PDCP protocol stack 300 may include an adaptation processing module or component 380 (also referred to as "Tx WLAN adaptation module"), which may be configured to generate one or more PDCP PDUs 323 based on packets to be offloaded via the non-cellular RAT, e.g., PDUs received from Tx link aggregation modules 350, 351, 352, and/or 354, e.g., as described below.

In some demonstrative embodiments, Tx WLAN adaptation module 380 may be configured to generate PDCP PDUs 323 in a form suitable for transmission over a non-cellular RAT link, for example, a WLAN link, e.g., by a WLAN Media Access Control (MAC) and/or Physical Layer (PHY) 390.

In some demonstrative embodiments, Tx WLAN adaptation module 380 may be configured to apply to the PDUs received from Tx link aggregation modules 350, 351, 352, 353, and/or 354 non-cellular RAT specific, e.g., WLAN-specific, PDCP-like functions.

In some demonstrative embodiments, Tx WLAN adaptation module 380 may be configured to apply to the PDUs received from Tx link aggregation modules 350, 351, 352, 353, and/or 354, for example, one or more procedures corresponding to the one or more PDCP procedures, which were not applied to the packet by Tx side 310 of PDCP protocol stack 300.

In some demonstrative embodiments, Tx WLAN adaptation module 380 may be configured to apply to the PDUs received from Tx link aggregation modules 350, 351, 352, 353, and/or 354 an encryption operation, a header compression operation, and the like.

In some demonstrative embodiments, Tx WLAN adaptation module 380 may be configured to receive a packet from a Tx link aggregation module, Tx link aggregation module 350, 351, 352, 353, or 354, and to encapsulate the packet in a tunneling packet, e.g., an Ethernet packet, a general packet radio service (GPRS) Tunneling Protocol User Plane (GTP-U) packet, an IP security (IPSec) packet, a User Datagram Protocol (UDP) packet, and/or any other type of packet, which may be configured for transmission over the non-cellular RAT link, e.g., the WLAN link.

In some demonstrative embodiments, Tx WLAN adaptation module 380 may be configured to apply to the packets offloaded to WLAN one or more tunneling operations of a tunneling protocol, for example, a WLAN tunneling protocol (WLTP), or any other tunneling protocol, which may be configured to deliver PDCP PDUs 323 between the cellular manager and the UE via the WLAN link.

In some demonstrative embodiments, a sequence number (SN) signaling scheme may be configured to signal a SN of the PDCP PDUs to be transmitted over the non-cellular RAT link, e.g., the PDCP PDUs generated by Tx link aggregation modules 350, 351, 352, 353, and/or 354.

In some demonstrative embodiments, the SN signaling scheme may be configured to support reordering, e.g., for the link aggregation.

In some demonstrative embodiments, the SN signaling scheme may be configured to enable Rx side 330 to reorder the packets received via the cellular link and the packets received via the non-cellular RAT link, e.g., the WLAN link.

In some demonstrative embodiments, a PDCP Sequence Number may be used for a "Link Aggregation" function, e.g., for the PDCP PDUs generated by Tx link aggregation modules 350, 351, 352, 353, and/or 354. According to these embodiments, for example, there may be no impact to a current PDCP PDU format.

In some demonstrative embodiments, a new field may be added in the PDCP header, for example, to carry a "Link Aggregation" Sequence Number, e.g., for the PDCP PDUs generated by Tx link aggregation modules 350, 351, 352, 353, and/or 354.

In some demonstrative embodiments, Tx side 310 may be configured to include a Link-Aggregation Sequence Number (LA-SN) in a PDCP header of a packet, for example, in addition to a PDCP Sequence Number, e.g., if the packet is to be sent over the cellular link.

In some demonstrative embodiments, Tx side 310 may be configured to include the LA-SN in a tunneling header of a packet, for example, if the packet is to be sent over the non-cellular RAT link.

In some demonstrative embodiments, Tx link aggregation modules 350, 351, 352, 353, and/or 354 may be configured to generate a PDCP PDU including a LA-SN in a PDCP header of the PDCP PDU.

In some demonstrative embodiments, the Rx side 330 of PDCP protocol stack 300 may be configured to apply one or more PDCP procedures to one or more PDUs received from the Tx side 310, e.g., including PDUs 324 and PDUs 323.

In some demonstrative embodiments, PDCP processor 144 (FIG. 1) may be configured to implement one or more operations, functionalities and/or components of Rx side 330, for example, to process uplink PDUs be received from UE 102 (FIG. 1), e.g., as described above.

In some demonstrative embodiments, PDCP processor 145 (FIG. 1) may be configured to implement one or more operations, functionalities and/or components of Tx side 310, for example, to process downlink PDUs received from cellular manager 104 (FIG. 1), e.g., as described above.

In some demonstrative embodiments, the Rx side 310 of PDCP protocol stack 300 may include a plurality of PDCP processing components to generate PDUs 369, e.g., IP PDUs, for example, by processing one or more first PDCP PDUs received via a cellular link, e.g., via PDUs 324, and/or one or more second PDCP PDUs received via a non-cellular RAT link, e.g., via PDUs 323.

In some demonstrative embodiments, the Rx side 330 of PDCP protocol stack 300 may include, for example, at least a PDCP header remover component 325, a deciphering component 326, an integrity verification component 327, a header decompression component 328, and/or an in order delivery and duplicate detection component 329, e.g., as described below. The Rx side 330 of PDCP protocol stack 300 may include any other additional or alternative component configured to apply any additional or alternative procedures.

In some demonstrative embodiments, the Rx side 330 of PDCP protocol stack 300 may be configured to process the one or more first PDCP PDUs, for example, by applying the sequence of PDCP procedures, e.g., by all components of Rx side 330, to the one or more first PDCP PDUs.

In some demonstrative embodiments, the Rx side 330 of PDCP protocol stack 300 may be configured to select not to apply one or more of the PDCP procedures, e.g., to apply only some of the PDCP procedures, to the one or more second PDCP PDUs, e.g., as described below.

In some demonstrative embodiments, the Rx side 330 of PDCP protocol stack 300 may include at least one link aggregation processing module or component (also referred to as "Rx link aggregation module"), which may be configured to receive a first PDCP PDU of the first PDCP PDUs processed by one or more of the plurality of PDCP procedures, to receive a second PDCP PDU of the second PDCP PDUs, which is not processed by the one or more of the plurality of PDCP procedures, and to output the first and second PDCP PDUs according to a reordering scheme, e.g., as described below.

In some demonstrative embodiments, the at least one RX link aggregation module may be configured to reorder packets received from both the cellular link, e.g., LTE, as well as the non-cellular RAT link, e.g., WLAN link, for example, while removing any duplicate packets.

In some demonstrative embodiments, the at least one Rx link aggregation module may be implemented to operate at one or more different stages and/or locations within the PDCP stack, for example, depending on which PDCP procedure is to be shared and/or reused across 3GPP and WLAN, e.g., as described below.

In some demonstrative embodiments, the Rx side 330 of PDCP protocol stack 300 may include at least one of a Rx link aggregation module 360, for example, to handle PDCP PDUs prior to PDCP header removal component 325; a Rx link aggregation module 361, for example, to handle PDCP PDUs prior to deciphering component 326 and/or integrity verification component 327; a Rx link aggregation module 362, for example, to handle PDCP PDUs prior to header decompression component 328; a Rx link aggregation module 363, for example, to handle PDCP PDUs prior to in order delivery and duplicate detection component 329; and/or a Rx link aggregation module 364, for example, to handle PDCP PDUs after in order delivery and duplicate detection component 329.

In some demonstrative embodiments, the Rx side 330 of PDCP protocol stack 300 may include an adaptation processing module or component 382 (also referred to as "Rx WLAN adaptation module"), which may be configured to decapsulate the second PDCP PDUs from tunneling packets received via the non-cellular RAT link, e.g., the tunneling packets generated by Tx WLAN adaptation module 380.

In some demonstrative embodiments, Rx WLAN adaptation module 382 may be configured to receive a tunneling packet from the WLAN link, to remove a tunneling header of the tunneling packet, and forward a decapsulated payload of the tunneling packet to an appropriate Rx link aggregation module of Rx link aggregation modules 360, 361, 362, 363 and/or 364.

In some demonstrative embodiments, Rx link aggregation modules 360, 361, 362, 363 and/or 364 may be configured to receive packets from a lower PDCP function, and the tunneling packet payloads from Rx WLAN Adaptation RX module 382 perform reordering when needed, and send the processed packets to an upper PDCP function.

In some demonstrative embodiments, Rx link aggregation modules 360, 361, 362, 363 and/or 364 may be configured to reorder the packets from the PDCP function, and tunneling packet payloads from Rx WLAN Adaptation module 382, for example, based on the SN appended to the packets.

In some demonstrative embodiments, Rx link aggregation modules 360, 361, 362, 363 and/or 364 may be configured to reorder a first PDCP PDU, e.g., from a PDCP process, and a second PDCP PDU, e.g., from Rx WLAN Adaptation module 382, for example, according to a first LA-SN in a PDCP header of the first PDCP PDU and a second LA-SN in a header of the second PDCP PDU.

In one example, a Link Aggregation function, e.g., a Tx link aggregation component and/or a Rx link aggregation component, may be implemented between an upper PDCP function, e.g., Header Compression, and a lower PDCP function, e.g., Ciphering.

According to this example, Tx link aggregation component 352 may be implemented to receive an IP packet to be offloaded to WLAN, for example, after header compression component 316 and before PDCP Ciphering component 320. Accordingly, the IP packet may be with header compression.

According to this example, Tx link aggregation component 352 may be configured to assign a Link Aggregation Sequence Number (LA-SN) to the packet.

According to this example, Tx link aggregation component 352 may be configured to output the IP packet with header compression and including the LA-SN.

According to this example, Tx WLAN adaptation module 380 may be configured to receive the IP packet from Tx link aggregation component 352, and to generate a tunneling packet having a tunneling header, which includes the LA-SN, and having a tunneling payload carrying the IP packet with the header compression.

According to this example, Rx WLAN adaptation module 382 may be configured to receive the tunneling packet and to decapsulate the IP packet from the tunneling packet. For example, Rx WLAN adaptation module 382 may be configured to output the IP packet with header compression, and the LA-SN.

According top this example, Rx link aggregation module 362 may be implemented to receive the IP packet and the LA-SN from Rx WLAN adaptation module 382, to reorder the IP packet with respect to any other packets, e.g., received from components 327 and/or 326, and to output the IP packet with header compression.

In another example, a Link Aggregation function, e.g., a Tx link aggregation component and/or a Rx link aggregation component, may be implemented above the PDCP Sequence Numbering/In-order Delivery component. According to this example, there may be no upper PDCP function, and the PDCP Sequence Numbering/In-order Delivery may be a lower PDCP function.

According to this example, Tx link aggregation module 350 may be implemented to receive an IP packet 312, e.g., without header compression.

According to this example, Tx link aggregation module 350 may be configured to assign to the IP packet a LA-SN, and to provide the IP packet without header compression and with the assigned LA-SN to Tx WLAN adaptation module 380.

According to this example, Tx WLAN adaptation module 380 may generate a tunneling Packet, having a tunneling header including the LA-SN, and having a tunneling payload carrying the IP packet without header compression.

According to this example, Rx WLAN adaptation module 382 may be configured to receive the tunneling packet and to decapsulate the IP packet from the tunneling packet. For example, Rx WLAN adaptation module 382 may be configured to output the IP packet without header compression, and the LA-SN.

According top this example, Rx link aggregation module 364 may be implemented to receive the IP packet and the LA-SN from Rx WLAN adaptation module 382, to reorder the IP packet with respect to any other packets, e.g., received from component 329, and to output the IP packet without header compression.

Figure 4:
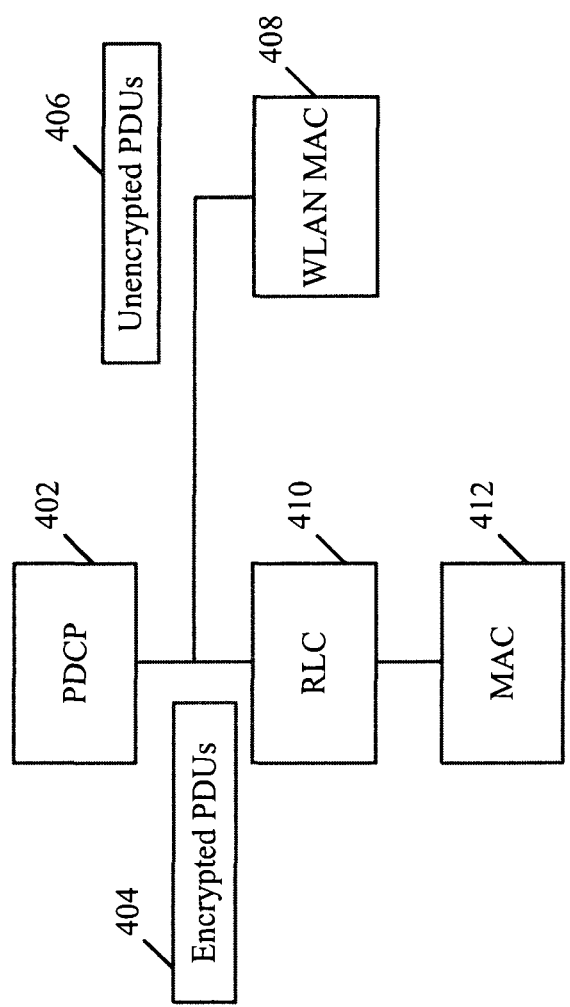
FIG. 4 is a schematic illustration of a selective PDCP processing scheme, in accordance with some demonstrative embodiments.

Reference is made to FIG. 4, which schematically illustrates a selective PDCP processing scheme, in accordance with some demonstrative embodiments. For example, cellular manager 104 (FIG. 1) and/or UE 102 (FIG. 1) may be configured to operate according to the selective PDCP processing scheme of FIG. 4.

In some demonstrative embodiments, the selective PDCP processing scheme of FIG. 4 may be configured to enable to selectively apply a ciphering function to only some PDCP PDUs, e.g., while selecting not to apply the ciphering function to one or more other PDCP PDUs.

In some demonstrative embodiments, the concept of selectively applying a ciphering function to only some PDCP PDUs may be in contrast to a current definition of a PDCP layer, which may be defined to apply the ciphering function to all PDCP PDUs indicated by upper layers for the uplink and the downlink, for example, as defined by 3*GPP TS* 36.323 *version* 12.2.0 *Release* 12.

In some demonstrative embodiments, as shown in FIG. 4, a PDCP layer 402 may be configured to process PDUs of a bearer for which LTE/WLAN aggregation is enabled.

In some demonstrative embodiments, PDCP layer 402 may be configured to selectively apply a ciphering function to one or more first PDUs, for example, PDUs to be communicated over a cellular link, e.g., an LTE link.

In some demonstrative embodiments, PDCP layer 402 may be configured to select not to apply the ciphering function to one or more second PDUs, for example, PDUs to be communicated over a non-cellular RAT link, e.g., a WLAN link.

In some demonstrative embodiments, PDCP layer 402 may generate encrypted PDUs 404, for example, by applying the ciphering function to the first PDUs; and unencrypted PDUs 406, for example, by selecting not to apply the ciphering function to the second PDUs.

In some demonstrative embodiments, the encrypted PDUs 404 may be processed by a Radio Link Control (RLC) module 410, and a cellular MAC module 412, e.g., for communication over the cellular link; and/or the unencrypted PDUs 406 may be processed by a WLAN MAC module 408, e.g., for communication over the WLAN link.

In some demonstrative embodiments, the selective PDCP processing scheme of FIG. 4 may be configured for a collocated deployment, for example, when LTE eNB and a WT node are connected via internal interfaces; and/or for a non-collocated deployment, for example, when LTE eNB and a WT node are connected via an external interface. In the latter case, sending unencrypted PDCP PDUs 406 over the external interface may not compromise security, for example, if the external interface between the eNB and the WT node is protected, e.g., using an IPSec protocol.

In some demonstrative embodiments, for communication over a downlink from a cellular manager, e.g., cellular manager 104 (FIG. 1), and a UE, e.g., UE 102 (FIG. 1), cellular authentication and/or encryption procedures, e.g., in compliance with standard LTE encryption and/or authentication protocols, may be implemented on the cellular link, for example, even with no changes.

In some demonstrative embodiments, PDCP layer 402 at the side of the cellular manager, e.g., cellular manager 104 (FIG. 1) may be configured to identify which downlink PDUs are to sent via the cellular link, and which downlink PDUs are to be sent via the WLAN link.

In one example, PDCP layer 402 may be configured to implement one or more functionalities of a scheduler.

In some demonstrative embodiments, PDCP layer 402 may not be aware via which link downlink PDCP PDUs will be sent. According to these embodiments, PDCP layer 402 may be configured to provide both encrypted and unencrypted PDUs to lower layers, which may be configured to perform scheduling, and to send the encrypted PDUs via the cellular link, and unencrypted PDUs to the WT node, e.g., WLAN AP/AC.

In some demonstrative embodiments, PDCP PDUs, which are scheduled to be delivered via the cellular link may be sent, e.g., even without any change.

In some demonstrative embodiments, PDCP PDUs, which are scheduled to be delivered via the WLAN link, e.g., directly in case of collocated eNB/AP deployment or via an external interface in case of non-collocated deployment, may be processed without implementing ciphering. The PDCP layer 402 may apply to the PDCP PDUs one or more other "normal" PDCP functionalities, e.g. re-ordering, and the like.

In some demonstrative embodiments, on the WLAN link, WLAN authentication and encryption may be performed, for example, using a Pre Shared Key (PSK). For example, WLAN keys may be derived from LTE keys, e.g., independently by the WLAN AP/AC and the UE/STA.

In some demonstrative embodiments, for example, in case of a non-collocated eNB/AP deployment, the keys may be generated by the eNB and sent to the AP/AC via the external interface. According to these embodiments, new WLAN keys derived from the LTE keys are sent out of the eNB, while the LTE keys are not sent out of the eNB. Accordingly, LTE security is not compromised.

In some demonstrative embodiments, the PDCP layer 402 on the UE side, e.g., UE 102 (FIG. 1), may be configured to select not to perform decryption for PDUs received from the WLAN link, e.g., as described above.

In some demonstrative embodiments, one or more of the procedures described above for handling the PDCP PDUs in the downlink may be applied with respect to handling PDCP PDUs communicated in the uplink, for example, from UE 102 (FIG. 1) to cellular manager 104 (FIG. 1).

Figure 5:
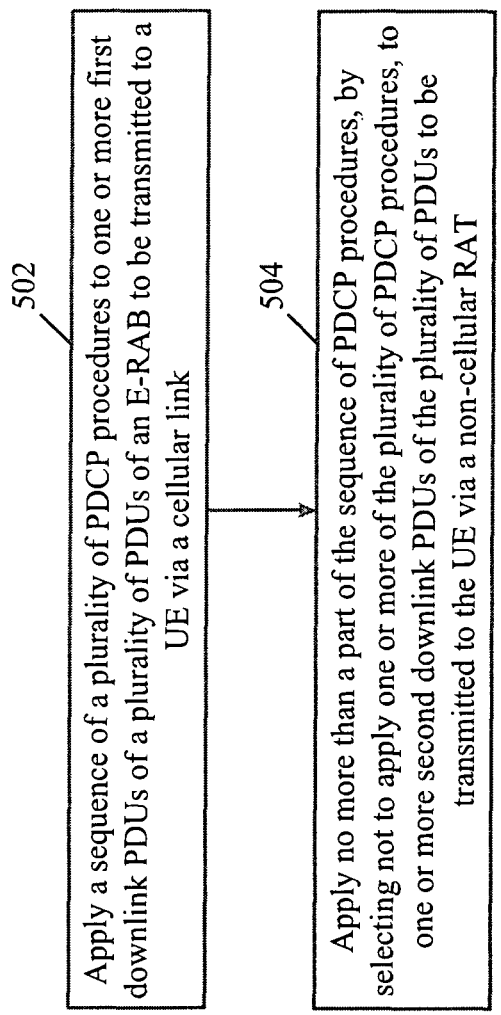
FIG. 5 is a schematic flow-chart illustration of a method of processing downlink PDCP Protocol Data Units (PDUs) at an Evolved Node B (eNB), in accordance with some demonstrative embodiments.

FIG. 5 is a schematic flow-chart illustration of a method of processing downlink PDCP Protocol Data Units (PDUs) at an Evolved Node B (eNB), in accordance with some demonstrative embodiments. In some embodiments, one or more of the operations of the method of FIG. 5 may be performed by a wireless communication system e.g., system 100 (FIG. 1); a cellular node, e.g., cellular node 104 (FIG. 1); an interface, e.g., cellular TRx 167 (FIG. 1), and/or interface 169 (FIG. 1); and/or a PDCP processor, e.g., PDCP processor 144 (FIG. 1).

As indicated at block 502, the method may include applying a sequence of a plurality of PDCP procedures to one or more first downlink PDUs of a plurality of PDUs of an E-RAB to be transmitted to a UE via a cellular link. For example, PDCP processor 144 (FIG. 1) may be configured to apply the plurality of PDCP procedures to PDUs to be communicated to UE 102 (FIG. 1) via a cellular link, e.g., as described above.

As indicated at block 504, the method may include applying no more than a part of the sequence of PDCP procedures, by selecting not to apply one or more of the plurality of PDCP procedures, to one or more second downlink PDUs of the plurality of PDUs to be transmitted to the UE via a non-cellular RAT. For example, PDCP processor 144 (FIG. 1) may be configured to apply no more than a part of the sequence of PDCP procedures to PDUs to be communicated to UE 102 (FIG. 1) via a WLAN link, e.g., as described above.

Figure 6:
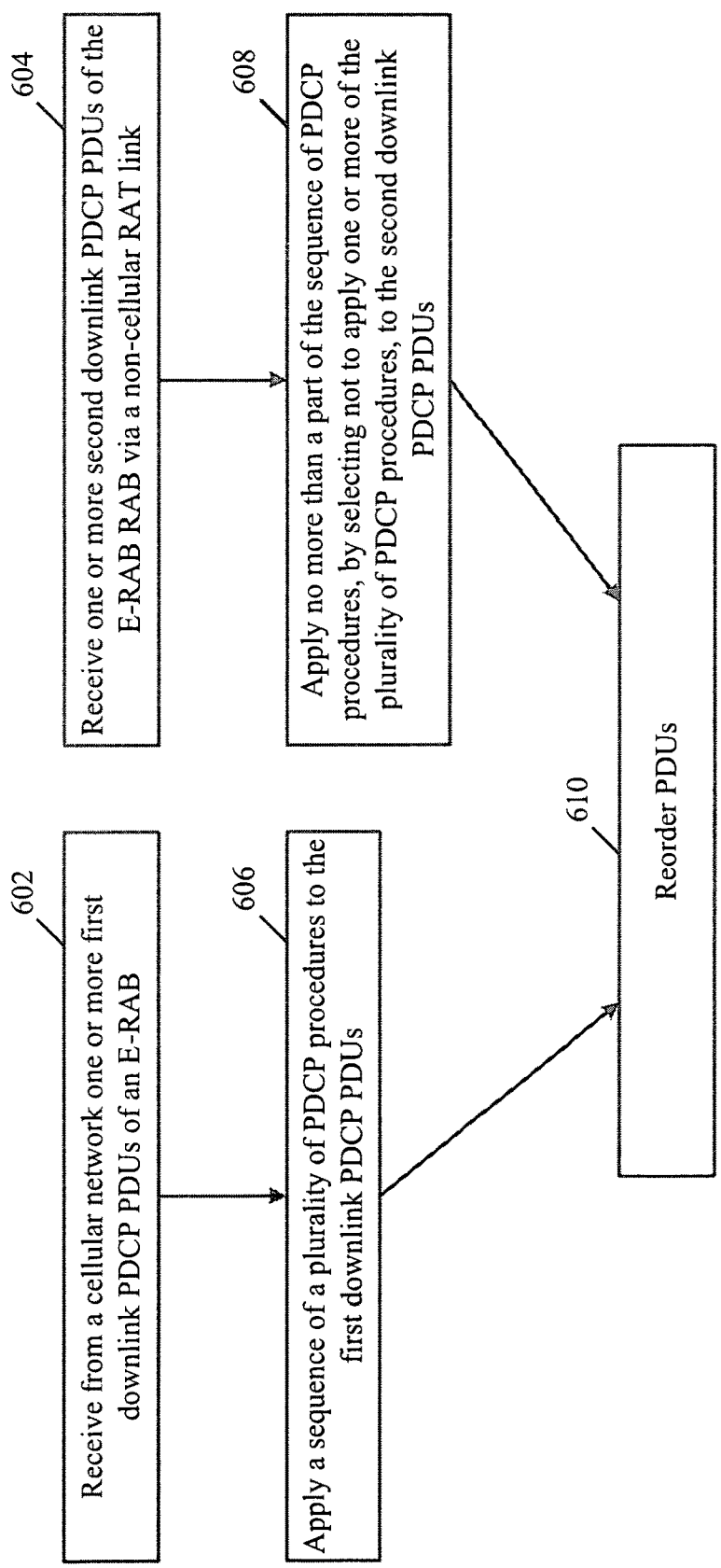
FIG. 6 is a schematic flow-chart illustration of a method of processing downlink PDCP PDUs at a UE, in accordance with some demonstrative embodiments.

FIG. 6 is a schematic flow-chart illustration of a method of processing downlink PDCP PDUs at a UE, in accordance with some demonstrative embodiments. In some embodiments, one or more of the operations of the method of FIG. 6 may be performed by a wireless communication system e.g., system 100 (FIG. 1); a UE, e.g., UE 102 (FIG. 1); an interface, e.g., cellular TRx 165 (FIG. 1), and/or non-cellular RAT TRx 163 (FIG. 1), and/or a PDCP processor, e.g., PDCP processor 145 (FIG. 1).

As indicated at block 602, the method may include receiving from a cellular network one or more first downlink PDCP PDUs of an E-RAB. For example, UE 102 (FIG. 1) may receive one or more first downlink PDCP PDUs of an E-RAB from cellular manager 104 (FIG. 1), e.g., via cellular link, as described above.

As indicated at block 604, the method may include receiving one or more second downlink PDCP PDUs of the E-RAB RAB via a non-cellular RAT link. For example, UE 102 (FIG. 1) may receive one or more second downlink PDCP PDUs of the E-RAB via a non-cellular RAT link, e.g., as described above.

As indicated at block 606, the method may include applying a sequence of a plurality of PDCP procedures to the first downlink PDCP PDUs. For example, PDCP processor 145 (FIG. 1) may be configured to apply the plurality of PDCP procedures to the first downlink PDCP PDUs received from cellular manager 104 (FIG. 1) via the cellular link, e.g., as described above.

As indicated at block 608, the method may include applying no more than a part of the sequence of PDCP procedures, by selecting not to apply one or more of the plurality of PDCP procedures, to the second downlink PDCP PDUs. For example, PDCP processor 145 (FIG. 1) may be configured to apply no more than a part of the sequence of PDCP procedures, by selecting not to apply one or more of the plurality of PDCP procedures, to the second downlink PDCP PDUs, e.g., as described above.

As indicated at block 610, the method may include reordering the first and second downlink PDUs. For example, PDCP processor 145 (FIG. 1) may be configured to reorder the first and second downlink PDCP PDUs, e.g., as described above.

Figure 7:
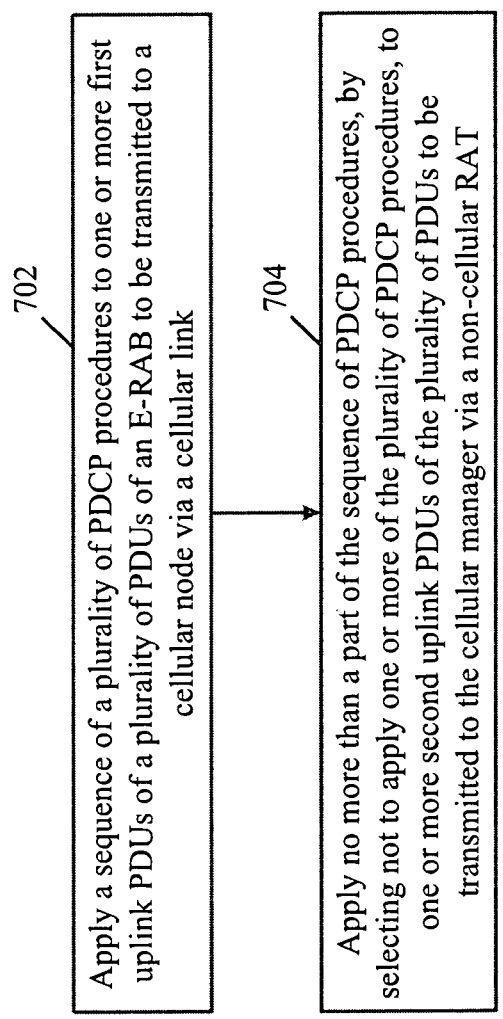
FIG. 7 is a schematic flow-chart illustration of a method of processing uplink PDCP PDUs at a UE, in accordance with some demonstrative embodiments.

FIG. 7 is a schematic flow-chart illustration of a method of processing uplink PDCP PDUs at a UE, in accordance with some demonstrative embodiments. In some embodiments, one or more of the operations of the method of FIG. 7 may be performed by a wireless communication system e.g., system 100 (FIG. 1); a UE, e.g., UE 102 (FIG. 1); an interface, e.g., cellular TRx 165 (FIG. 1), and/or non-cellular RAT TRx 163 (FIG. 1), and/or a PDCP processor, e.g., PDCP processor 145 (FIG. 1).

As indicated at block 702, the method may include applying a sequence of a plurality of PDCP procedures to one or more first uplink PDUs of a plurality of PDUs of an E-RAB to be transmitted to a cellular node via a cellular link. For example, PDCP processor 145 (FIG. 1) may be configured to apply the plurality of PDCP procedures to PDUs to be communicated to cellular manager 104 (FIG. 1), e.g., to an eNB, via a cellular link, e.g., as described above.

As indicated at block 704, the method may include applying no more than a part of the sequence of PDCP procedures, by selecting not to apply one or more of the plurality of PDCP procedures, to one or more second uplink PDUs of the plurality of PDUs to be transmitted to the cellular manager via a non-cellular RAT. For example, PDCP processor 145 (FIG. 1) may be configured to apply no more than a part of the sequence of PDCP procedures to PDUs to be communicated to cellular manager 104 (FIG. 1), e.g., an eNB, via a WLAN link, e.g., as described above.

Figure 8:
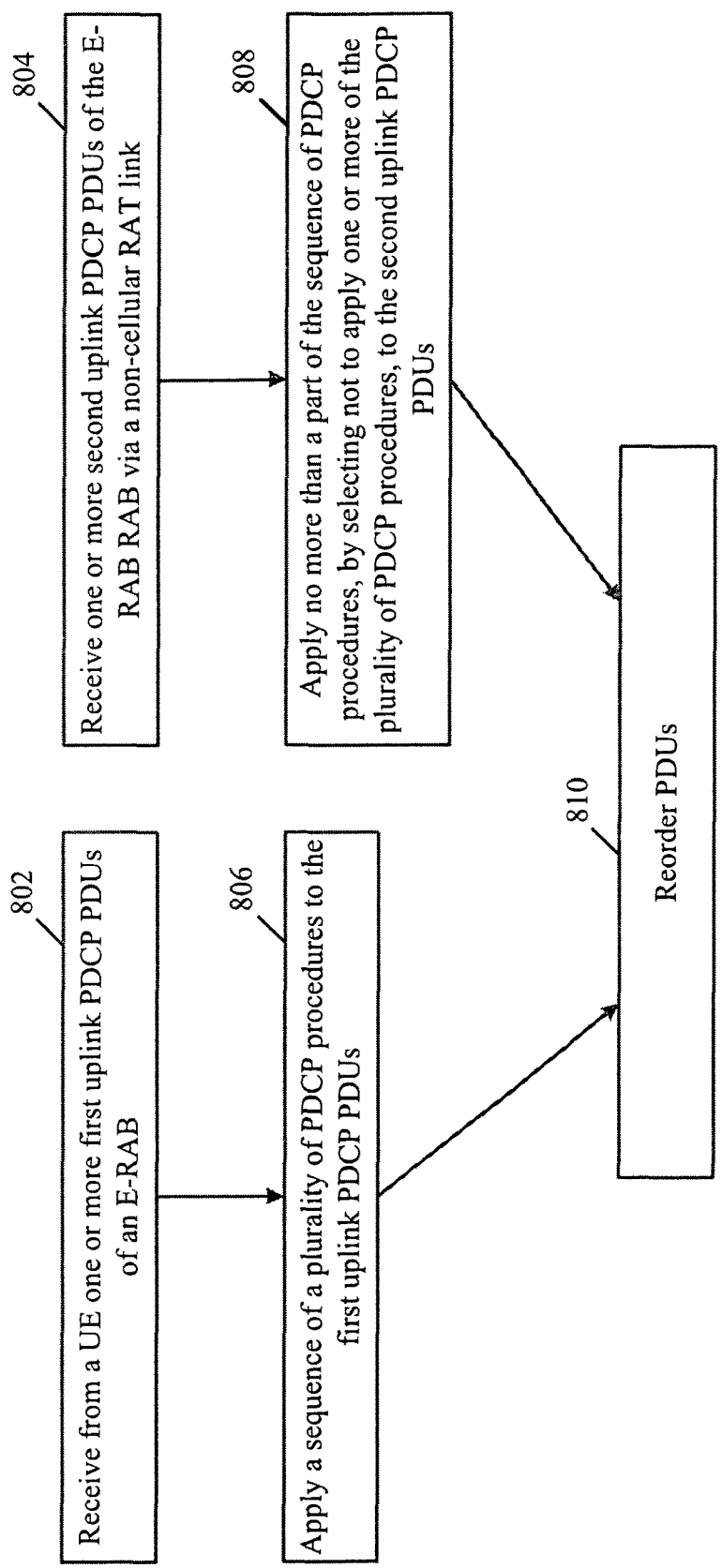
FIG. 8 is a schematic flow-chart illustration of a method of processing uplink PDCP PDUs at an eNB, in accordance with some demonstrative embodiments.

FIG. 8 is a schematic flow-chart illustration of a method of processing uplink PDCP PDUs at an eNB, in accordance with some demonstrative embodiments. In some embodiments, one or more of the operations of the method of FIG. 8 may be performed by a wireless communication system e.g., system 100 (FIG. 1); a cellular node, e.g., cellular node 104 (FIG. 1); an interface, e.g., cellular TRx 167 (FIG. 1), and/or interface 169 (FIG. 1); and/or a PDCP processor, e.g., PDCP processor 144 (FIG. 1).

As indicated at block 802, the method may include receiving from a UE one or more first uplink PDCP PDUs of an E-RAB. For example, cellular manager 104 (FIG. 1) may receive one or more first downlink PDCP PDUs of an E-RAB from UE 102 (FIG. 1), e.g., via cellular link, as described above.

As indicated at block 804, the method may include receiving one or more second uplink PDCP PDUs of the E-RAB RAB via a non-cellular RAT link. For example, cellular manager 104 (FIG. 1) may receive one or more second uplink PDCP PDUs of the E-RAB via a non-cellular RAT link, e.g., as described above.

As indicated at block 806, the method may include applying a sequence of a plurality of PDCP procedures to the first uplink PDCP PDUs. For example, PDCP processor 144 (FIG. 1) may be configured to apply the plurality of PDCP procedures to the first unlink PDCP PDUs received from UE 102 (FIG. 1) via the cellular link, e.g., as described above.

As indicated at block 808, the method may include applying no more than a part of the sequence of PDCP procedures, by selecting not to apply one or more of the plurality of PDCP procedures, to the second uplink PDCP PDUs. For example, PDCP processor 144 (FIG. 1) may be configured to apply no more than a part of the sequence of PDCP procedures, by selecting not to apply one or more of the plurality of PDCP procedures, to the second uplink PDCP PDUs, e.g., as described above.

As indicated at block 810, the method may include reordering the first and second uplink PDUs. For example, PDCP processor 144 (FIG. 1) may be configured to reorder the first and second uplink PDCP PDUs, e.g., as described above.

Figure 9:
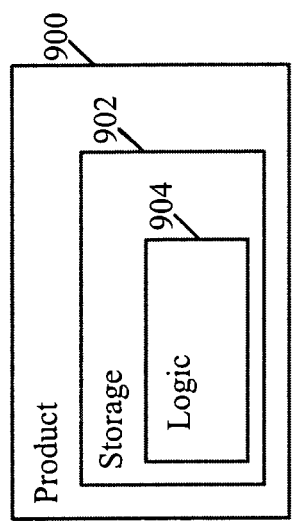
FIG. 9 is a schematic illustration of a product, in accordance with some demonstrative embodiments.

Reference is made to FIG. 9, which schematically illustrates a product of manufacture 900, in accordance with some demonstrative embodiments. Product 900 may include a non-transitory machine-readable storage medium 902 to store logic 904, which may be used, for example, to perform at least part of the functionality of one or more components of a cellular manager, for example, an eNB, e.g., cellular manager 104 (FIG. 1); one or more components of a UE, e.g., UE 102 (FIG. 1); one or more components of a PDCP processor, e.g., PDCP processor 144 (FIG. 1), and/or PDCP Processor 145 (FIG. 1); one or more components of a PDCP layer protocol stack, e.g., PDCP protocol stack 300 (FIG. 3); one or more components of a PDCP layer, e.g., PDCP layer 402 (FIG. 4), and/or to perform one or more operations of the methods of FIGS. 5, 6, 7, and/or 8, and/or one or more operations and/or functionalities described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of an evolved Node B (eNB) comprising an air interface to communicate with a User Equipment (UE) via a cellular link; and a Packet Data Convergence Protocol (PDCP) processor configured to process a plurality of downlink Protocol Data Units (PDUs) of an Evolved Universal Mobile Telecommunications System (UMTS) Terrestrial Radio Access Network (E-UTRAN) Radio Access Bearer (E-RAB), the PDCP processor configured to apply a sequence of a plurality of PDCP procedures to one or more first downlink PDUs to be transmitted to the UE via the cellular link, and to apply no more than a part of the sequence of PDCP procedures, by selecting not to apply one or more of the plurality of PDCP procedures, to one or more second downlink PDUs to be transmitted to the UE via a non-cellular Radio Access Technology (RAT).

Example 2 includes the subject matter of Example 1, and optionally, wherein the sequence of PDCP procedures comprises a ciphering procedure, the PDCP processor configured to select not to apply the ciphering procedure to the second downlink PDUs, the PDCP processor configured to generate one or more encrypted PDCP PDUs based on the one or more first downlink PDUs, and to generate one or more unencrypted PDCP PDUs based on the one or more second downlink PDUs.

Example 3 includes the subject matter of Example 1 or 2, and optionally, wherein the PDCP processor comprises a link aggregation processing module configured to receive a PDU of the plurality of downlink PDUs before a PDCP procedure of the plurality of PDCP procedures, the link aggregation processing module configured to transfer the PDU to be processed by the PDCP procedure, if the PDU is to be transmitted via the cellular link, or to provide a PDCP PDU, which is not processed by the PDCP procedure, if the PDU is to be transmitted via the non-cellular RAT.

Example 4 includes the subject matter of Example 3, and optionally, wherein the link aggregation processing module is configured to generate the PDCP PDU comprising a Link-Aggregation Sequence Number (LA-SN) in a PDCP header of the PDCP PDU.

Example 5 includes the subject matter of Example 3 or 4, and optionally, comprising an adaptation processing module configured to encapsulate the PDCP PDU in a tunneling packet to be tunneled via a link of the non-cellular RAT.

Example 6 includes the subject matter of any one of Examples 1-5, and optionally, wherein the PDCP processor is configured to generate a plurality of PDCP PDUs corresponding to the plurality of downlink PDUs, a header of a PDCP PDU of the plurality of PDCP PDUs comprising a Link-Aggregation Sequence Number (LA-SN).

Example 7 includes the subject matter of any one of Examples 1-6, and optionally, wherein the air interface is configured to send to the UE a Radio Resource Control (RRC) message comprising an indication of the one or more PDCP procedures, which are not to be applied to the one or more second downlink PDUs.

Example 8 includes the subject matter of any one of Examples 1-7, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 9 includes the subject matter of any one of Examples 1-8, and optionally, wherein the non-cellular RAT comprises a Wireless Local Area Network (WLAN).

Example 10 includes the subject matter of Example 9, and optionally, comprising a WLAN Termination (WT) node interface configured to send the second downlink PDUs to a WT node.

Example 11 includes the subject matter of Example 9, and optionally, comprising a WLAN UE interface configured to send the second downlink PDUs to the UE via a WLAN link.

Example 12 includes the subject matter of any one of Examples 1-11, and optionally, comprising a plurality of antennas, a memory, and a processor.

Example 13 includes an apparatus of a User Equipment (UE) comprising a cellular transceiver to receive from a cellular network one or more first downlink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB); a non-cellular Radio Access Technology (RAT) transceiver to receive via a non-cellular RAT link one or more second downlink PDCP PDUs of the E-RAB; and a PDCP processor configured to apply a sequence of a plurality of PDCP procedures to the first downlink PDCP PDUs, and to apply no more than a part of the sequence of PDCP procedures, by selecting not to apply one or more of the plurality of PDCP procedures, to the second downlink PDCP PDUs.

Example 14 includes the subject matter of Example 13, and optionally, wherein the sequence of PDCP procedures comprises a deciphering procedure, the PDCP processor configured to select not to apply the deciphering procedure to the second downlink PDCP PDUs, the first downlink PDCP PDUs comprising encrypted PDCP PDUs, the second downlink PDCP PDUs comprising unencrypted PDCP PDUs.

Example 15 includes the subject matter of Example 13 or 14, and optionally, wherein the PDCP processor comprises a link aggregation processing module configured to receive a first PDCP PDU of the first downlink PDCP PDUs processed by the one or more of the plurality of PDCP procedures, to receive a second PDCP PDU of the second downlink PDCP PDUs, which is not processed by the one or more of the plurality of PDCP procedures, and to output the first and second PDCP PDUs according to a reordering scheme.

Example 16 includes the subject matter of Example 15, and optionally, wherein the link aggregation processing module is configured to output the first and second PDCP PDUs to a PDCP procedure above the one or more of the plurality of PDCP procedures.

Example 17 includes the subject matter of Example 15 or 16, and optionally, wherein the link aggregation processing module is configured to reorder the first and second PDCP PDUs according to a first Link-Aggregation Sequence Number (LA-SN) in a PDCP header of the first PDCP PDU and a second LA-SN in a header of the second PDCP PDU.

Example 18 includes the subject matter of any one of Examples 15-17, and optionally, comprising an adaptation processing module configured to decapsulate the second PDCP PDU from a tunneling packet received via the non-cellular RAT link.

Example 19 includes the subject matter of any one of Examples 13-18, and optionally, wherein the PDCP processor is configured to determine the one or more PDCP procedures, which are not to be applied to the second downlink PDCP PDUs, based on an indication in a Radio Resource Control (RRC) message received by the cellular transceiver.

Example 20 includes the subject matter of any one of Examples 13-19, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 21 includes the subject matter of any one of Examples 13-20 configured to determine the one or more of the plurality of PDCP procedures, which are not to be applied to the one or more second downlink PDUs, based on a Radio Resource Control (RRC) message received from the cellular network.

Example 22 includes the subject matter of any one of Examples 13-21, and optionally, wherein the non-cellular RAT link comprises a Wireless Local Area Network (WLAN) link.

Example 23 includes the subject matter of any one of Examples 13-22, and optionally, comprising one or more antennas; a memory; and a processor.

Example 24 includes an apparatus of an evolved Node B (eNB) comprising an air interface to receive from a User Equipment (UE) one or more first uplink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearers (E-RAB); a non-cellular Radio Access Technology (RAT) interface to receive via a non-cellular RAT link one or more second uplink PDCP PDUs of the E-RAB; and a PDCP processor configured to apply a sequence of a plurality of PDCP procedures to the first uplink PDCP PDUs, and to apply no more than a part of the sequence of PDCP procedures, by selecting not to apply one or more of the plurality of PDCP procedures, to the second uplink PDCP PDUs.

Example 25 includes the subject matter of Example 24, and optionally, wherein the sequence of PDCP procedures comprises a deciphering procedure, the PDCP processor configured to select not to apply the deciphering procedure to the second uplink PDCP PDUs, the first uplink PDCP PDUs comprising encrypted PDCP PDUs, the second uplink PDCP PDUs comprising unencrypted PDCP PDUs.

Example 26 includes the subject matter of Example 24 or 25, and optionally, wherein the PDCP processor comprises a link aggregation processing module configured to receive a first PDCP PDU of the first uplink PDCP PDUs processed by the one or more of the plurality of PDCP procedures, to receive a second PDCP PDU of the second uplink PDCP PDUs, which is not processed by the one or more of the plurality of PDCP procedures, and to output the first and second PDCP PDUs according to a reordering scheme.

Example 27 includes the subject matter of Example 26, and optionally, wherein the link aggregation processing module is configured to output the first and second PDCP PDUs to a PDCP procedure above the one or more of the plurality of PDCP procedures.

Example 28 includes the subject matter of Example 26 or 27, and optionally, wherein the link aggregation processing module is configured to reorder the first and second PDCP PDUs according to a first Link-Aggregation Sequence Number (LA-SN) in a PDCP header of the first PDCP PDU and a second LA-SN in a header of the second PDCP PDU.

Example 29 includes the subject matter of any one of Examples 26-28, and optionally, comprising an adaptation processing module configured to decapsulate the second PDCP PDU from a tunneling packet received via the non-cellular RAT link.

Example 30 includes the subject matter of any one of Examples 24-29, and optionally, wherein the air interface is configured to send to the UE a Radio Resource Control (RRC) message comprising an indication of the one or more PDCP procedures, which are not to be applied to the one or more second uplink PDUs.

Example 31 includes the subject matter of any one of Examples 24-30, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 32 includes the subject matter of any one of Examples 24-31, and optionally, wherein the non-cellular RAT link comprises a Wireless Local Area Network (WLAN) link.

Example 33 includes the subject matter of any one of Examples 24-32, and optionally, comprising a plurality of antennas, a memory, and a processor.

Example 34 includes an apparatus of a User Equipment (UE) comprising a cellular transceiver to communicate with an Evolved Node B (eNB) via a cellular link; a non-cellular Radio Access Technology (RAT) transceiver to communicate over a non-cellular RAT link; a Packet Data Convergence Protocol (PDCP) processor configured to process a plurality of uplink Protocol Data Units (PDUs) of an Evolved Universal Mobile Telecommunications System (UMTS) Terrestrial Radio Access Network (E-UTRAN) Radio Access Bearer (E-RAB), the PDCP processor configured to apply a sequence of a plurality of PDCP procedures to one or more first uplink PDUs to be transmitted to the eNB via the cellular link, and to apply no more than a part of the sequence of PDCP procedures, by selecting not to apply one or more of the plurality of PDCP procedures, to one or more second uplink PDUs to be sent to the eNB via the non-cellular RAT link.

Example 35 includes the subject matter of Example 34, and optionally, wherein the sequence of PDCP procedures comprises a ciphering procedure, the PDCP processor configured to select not to apply the ciphering procedure to the second uplink PDUs, the PDCP processor configured to generate one or more encrypted PDCP PDUs based on the one or more first uplink PDUs, and to generate one or more unencrypted PDCP PDUs based on the one or more second uplink PDUs.

Example 36 includes the subject matter of Example 34 or 35, and optionally, wherein the PDCP processor comprises a link aggregation processing module configured to receive a PDU of the plurality of uplink PDUs before a PDCP procedure of the plurality of PDCP procedures, the link aggregation processing module configured to transfer the PDU to be processed by the PDCP procedure, if the PDU is to be transmitted via the cellular link, or to provide a PDCP PDU, which is not processed by the PDCP procedure, if the PDU is to be transmitted via the non-cellular RAT link.

Example 37 includes the subject matter of Example 36, and optionally, wherein the link aggregation processing module is configured to generate the PDCP PDU comprising a Link-Aggregation Sequence Number (LA-SN) in a PDCP header of the PDCP PDU.

Example 38 includes the subject matter of Example 36 or 37, and optionally, comprising an adaptation processing module configured to encapsulate the PDCP PDU in a tunneling packet to be tunneled via the non-cellular RAT link.

Example 39 includes the subject matter of any one of Examples 34-38, and optionally, wherein the PDCP processor is configured to generate a plurality of PDCP PDUs corresponding to the plurality of uplink PDUs, a header of a PDCP PDU of the plurality of PDCP PDUs comprising a Link-Aggregation Sequence Number (LA-SN).

Example 40 includes the subject matter of any one of Examples 34-39, and optionally, wherein the PDCP processor is configured to determine the one or more PDCP procedures, which are not to be applied to the second uplink PDCP PDUs, based on an indication in a Radio Resource Control (RRC) message received by the cellular transceiver.

Example 41 includes the subject matter of any one of Examples 34-40, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 42 includes the subject matter of any one of Examples 34-41, and optionally, wherein the non-cellular RAT link comprises a Wireless Local Area Network (WLAN) link.

Example 43 includes the subject matter of any one of Examples 34-42, and optionally, comprising one or more antennas; a memory; and a processor.

Example 44 includes a method to be performed at an evolved Node B (eNB), the method comprising communicating with a User Equipment (UE) via a cellular link; processing a plurality of downlink Protocol Data Units (PDUs) of an Evolved Universal Mobile Telecommunications System (UMTS) Terrestrial Radio Access Network (E-UTRAN) Radio Access Bearer (E-RAB); applying a sequence of a plurality of Packet Data Convergence Protocol (PDCP) procedures to one or more first downlink PDUs to be transmitted to the UE via the cellular link; and applying no more than a part of the sequence of PDCP procedures, by selecting not to apply one or more of the plurality of PDCP procedures, to one or more second downlink PDUs to be transmitted to the UE via a non-cellular Radio Access Technology (RAT).

Example 45 includes the subject matter of Example 44, and optionally, wherein the sequence of PDCP procedures comprises a ciphering procedure, the method comprising selecting not to apply the ciphering procedure to the second downlink PDUs, generating one or more encrypted PDCP PDUs based on the one or more first downlink PDUs, and generating one or more unencrypted PDCP PDUs based on the one or more second downlink PDUs.

Example 46 includes the subject matter of Example 44 or 45, and optionally, comprising receiving a PDU of the plurality of downlink PDUs before a PDCP procedure of the plurality of PDCP procedures, transferring the PDU to be processed by the PDCP procedure, if the PDU is to be transmitted via the cellular link, or providing a PDCP PDU, which is not processed by the PDCP procedure, if the PDU is to be transmitted via the non-cellular RAT.

Example 47 includes the subject matter of Example 46, and optionally, comprising generating the PDCP PDU comprising a Link-Aggregation Sequence Number (LA-SN) in a PDCP header of the PDCP PDU.

Example 48 includes the subject matter of Example 46 or 47, and optionally, comprising encapsulating the PDCP PDU in a tunneling packet to be tunneled via a link of the non-cellular RAT.

Example 49 includes the subject matter of any one of Examples 44-48, and optionally, comprising generating a plurality of PDCP PDUs corresponding to the plurality of downlink PDUs, a header of a PDCP PDU of the plurality of PDCP PDUs comprising a Link-Aggregation Sequence Number (LA-SN).

Example 50 includes the subject matter of any one of Examples 44-49, and optionally, comprising sending to the UE a Radio Resource Control (RRC) message comprising an indication of the one or more PDCP procedures, which are not to be applied to the one or more second downlink PDUs.

Example 51 includes the subject matter of any one of Examples 44-50, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 52 includes the subject matter of any one of Examples 44-51, and optionally, wherein the non-cellular RAT comprises a Wireless Local Area Network (WLAN).

Example 53 includes the subject matter of Example 52, and optionally, comprising sending the second downlink PDUs to a WT node.

Example 54 includes the subject matter of Example 52, and optionally, comprising sending the second downlink PDUs to the UE via a WLAN link.

Example 55 includes a method to be performed at a User Equipment (UE), the method comprising receiving from a cellular network one or more first downlink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB); receiving via a non-cellular Radio Access Technology (RAT) link one or more second downlink PDCP PDUs of the E-RAB; applying a sequence of a plurality of PDCP procedures to the first downlink PDCP PDUs; and applying no more than a part of the sequence of PDCP procedures, by selecting not to apply one or more of the plurality of PDCP procedures, to the second downlink PDCP PDUs.

Example 56 includes the subject matter of Example 55, and optionally, wherein the sequence of PDCP procedures comprises a deciphering procedure, the method comprising selecting not to apply the deciphering procedure to the second downlink PDCP PDUs, the first downlink PDCP PDUs comprising encrypted PDCP PDUs, the second downlink PDCP PDUs comprising unencrypted PDCP PDUs.

Example 57 includes the subject matter of Example 55 or 56, and optionally, comprising receiving a first PDCP PDU of the first downlink PDCP PDUs processed by the one or more of the plurality of PDCP procedures, receiving a second PDCP PDU of the second downlink PDCP PDUs, which is not processed by the one or more of the plurality of PDCP procedures, and outputting the first and second PDCP PDUs according to a reordering scheme.

Example 58 includes the subject matter of Example 57, and optionally, comprising outputting the first and second PDCP PDUs to a PDCP procedure above the one or more of the plurality of PDCP procedures.

Example 59 includes the subject matter of Example 57 or 58, and optionally, comprising reordering the first and second PDCP PDUs according to a first Link-Aggregation Sequence Number (LA-SN) in a PDCP header of the first PDCP PDU and a second LA-SN in a header of the second PDCP PDU.

Example 60 includes the subject matter of any one of Examples 57-59, and optionally, comprising decapsulating the second PDCP PDU from a tunneling packet received via the non-cellular RAT link.

Example 61 includes the subject matter of any one of Examples 55-60, and optionally, comprising determining the one or more PDCP procedures, which are not to be applied to the second downlink PDCP PDUs, based on an indication in a Radio Resource Control (RRC) message received from the cellular network.

Example 62 includes the subject matter of any one of Examples 55-61, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 63 includes the subject matter of any one of Examples 55-62, and optionally, comprising determining the one or more of the plurality of PDCP procedures, which are not to be applied to the one or more second downlink PDUs, based on a Radio Resource Control (RRC) message received from the cellular network.

Example 64 includes the subject matter of any one of Examples 55-63, and optionally, wherein the non-cellular RAT link comprises a Wireless Local Area Network (WLAN) link.

Example 65 includes a method to be performed at an evolved Node B (eNB), the method comprising receiving from a User Equipment (UE) one or more first uplink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearers (E-RAB); receiving via a non-cellular Radio Access Technology (RAT) link one or more second uplink PDCP PDUs of the E-RAB; applying a sequence of a plurality of PDCP procedures to the first uplink PDCP PDUs; and applying no more than a part of the sequence of PDCP procedures, by selecting not to apply one or more of the plurality of PDCP procedures, to the second uplink PDCP PDUs.

Example 66 includes the subject matter of Example 65, and optionally, wherein the sequence of PDCP procedures comprises a deciphering procedure, the method comprising selecting not to apply the deciphering procedure to the second uplink PDCP PDUs, the first uplink PDCP PDUs comprising encrypted PDCP PDUs, the second uplink PDCP PDUs comprising unencrypted PDCP PDUs.

Example 67 includes the subject matter of Example 65 or 66, and optionally, comprising receiving a first PDCP PDU of the first uplink PDCP PDUs processed by the one or more of the plurality of PDCP procedures, receiving a second PDCP PDU of the second uplink PDCP PDUs, which is not processed by the one or more of the plurality of PDCP procedures, and outputting the first and second PDCP PDUs according to a reordering scheme.

Example 68 includes the subject matter of Example 67, and optionally, comprising outputting the first and second PDCP PDUs to a PDCP procedure above the one or more of the plurality of PDCP procedures.

Example 69 includes the subject matter of Example 67 or 68, and optionally, comprising reordering the first and second PDCP PDUs according to a first Link-Aggregation Sequence Number (LA-SN) in a PDCP header of the first PDCP PDU and a second LA-SN in a header of the second PDCP PDU.

Example 70 includes the subject matter of any one of Examples 67-69, and optionally, comprising decapsulating the second PDCP PDU from a tunneling packet received via the non-cellular RAT link.

Example 71 includes the subject matter of any one of Examples 65-70, and optionally, comprising sending to the UE a Radio Resource Control (RRC) message comprising an indication of the one or more PDCP procedures, which are not to be applied to the one or more second uplink PDUs.

Example 72 includes the subject matter of any one of Examples 65-71, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 73 includes the subject matter of any one of Examples 65-72, and optionally, wherein the non-cellular RAT link comprises a Wireless Local Area Network (WLAN) link.

Example 74 includes a method to be performed at a User Equipment (UE), the method comprising communicating with an Evolved Node B (eNB) via a cellular link; communicating over a non-cellular Radio Access Technology (RAT) link; processing a plurality of uplink Protocol Data Units (PDUs) of an Evolved Universal Mobile Telecommunications System (UMTS) Terrestrial Radio Access Network (E-UTRAN) Radio Access Bearer (E-RAB); applying a sequence of a plurality of Packet Data Convergence Protocol (PDCP) procedures to one or more first uplink PDUs to be transmitted to the eNB via the cellular link; and applying no more than a part of the sequence of PDCP procedures, by selecting not to apply one or more of the plurality of PDCP procedures, to one or more second uplink PDUs to be sent to the eNB via the non-cellular RAT link.

Example 75 includes the subject matter of Example 74, and optionally, wherein the sequence of PDCP procedures comprises a ciphering procedure, the method comprising selecting not to apply the ciphering procedure to the second uplink PDUs, generating one or more encrypted PDCP PDUs based on the one or more first uplink PDUs, and generating one or more unencrypted PDCP PDUs based on the one or more second uplink PDUs.

Example 76 includes the subject matter of Example 74 or 75, and optionally, comprising receiving a PDU of the plurality of uplink PDUs before a PDCP procedure of the plurality of PDCP procedures, transferring the PDU to be processed by the PDCP procedure, if the PDU is to be transmitted via the cellular link, or providing a PDCP PDU, which is not processed by the PDCP procedure, if the PDU is to be transmitted via the non-cellular RAT link.

Example 77 includes the subject matter of Example 76, and optionally, comprising generating the PDCP PDU comprising a Link-Aggregation Sequence Number (LA-SN) in a PDCP header of the PDCP PDU.

Example 78 includes the subject matter of Example 76 or 77, and optionally, comprising encapsulating the PDCP PDU in a tunneling packet to be tunneled via the non-cellular RAT link.

Example 79 includes the subject matter of any one of Examples 74-78, and optionally, comprising generating a plurality of PDCP PDUs corresponding to the plurality of uplink PDUs, a header of a PDCP PDU of the plurality of PDCP PDUs comprising a Link-Aggregation Sequence Number (LA-SN).

Example 80 includes the subject matter of any one of Examples 74-79, and optionally, comprising determining the one or more PDCP procedures, which are not to be applied to the second uplink PDCP PDUs, based on an indication in a Radio Resource Control (RRC) message received via the cellular link.

Example 81 includes the subject matter of any one of Examples 74-80, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 82 includes the subject matter of any one of Examples 74-81, and optionally, wherein the non-cellular RAT link comprises a Wireless Local Area Network (WLAN) link.

Example 83 includes a product comprising one or more tangible computer-readable storage media comprising computer-executable instructions operable to, when executed by at least one computer processor, enable the at least one computer processor to implement one or more operations at an evolved Node B (eNB), the operations comprising communicating with a User Equipment (UE) via a cellular link; processing a plurality of downlink Protocol Data Units (PDUs) of an Evolved Universal Mobile Telecommunications System (UMTS) Terrestrial Radio Access Network (E-UTRAN) Radio Access Bearer (E-RAB); applying a sequence of a plurality of Packet Data Convergence Protocol (PDCP) procedures to one or more first downlink PDUs to be transmitted to the UE via the cellular link; and applying no more than a part of the sequence of PDCP procedures, by selecting not to apply one or more of the plurality of PDCP procedures, to one or more second downlink PDUs to be transmitted to the UE via a non-cellular Radio Access Technology (RAT).

Example 84 includes the subject matter of Example 83, and optionally, wherein the sequence of PDCP procedures comprises a ciphering procedure, the operations comprising selecting not to apply the ciphering procedure to the second downlink PDUs, generating one or more encrypted PDCP PDUs based on the one or more first downlink PDUs, and generating one or more unencrypted PDCP PDUs based on the one or more second downlink PDUs.

Example 85 includes the subject matter of Example 83 or 84, and optionally, wherein the operations comprise receiving a PDU of the plurality of downlink PDUs before a PDCP procedure of the plurality of PDCP procedures, transferring the PDU to be processed by the PDCP procedure, if the PDU is to be transmitted via the cellular link, or providing a PDCP PDU, which is not processed by the PDCP procedure, if the PDU is to be transmitted via the non-cellular RAT.

Example 86 includes the subject matter of Example 85, and optionally, wherein the operations comprise generating the PDCP PDU comprising a Link-Aggregation Sequence Number (LA-SN) in a PDCP header of the PDCP PDU.

Example 87 includes the subject matter of Example 85 or 86, and optionally, wherein the operations comprise encapsulating the PDCP PDU in a tunneling packet to be tunneled via a link of the non-cellular RAT.

Example 88 includes the subject matter of any one of Examples 83-87, and optionally, wherein the operations comprise generating a plurality of PDCP PDUs corresponding to the plurality of downlink PDUs, a header of a PDCP PDU of the plurality of PDCP PDUs comprising a Link-Aggregation Sequence Number (LA-SN).

Example 89 includes the subject matter of any one of Examples 83-88, and optionally, wherein the operations comprise sending to the UE a Radio Resource Control (RRC) message comprising an indication of the one or more PDCP procedures, which are not to be applied to the one or more second downlink PDUs.

Example 90 includes the subject matter of any one of Examples 83-89, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 91 includes the subject matter of any one of Examples 83-90, and optionally, wherein the non-cellular RAT comprises a Wireless Local Area Network (WLAN).

Example 92 includes the subject matter of Example 91, and optionally, wherein the operations comprise sending the second downlink PDUs to a WT node.

Example 93 includes the subject matter of Example 91, and optionally, wherein the operations comprise sending the second downlink PDUs to the UE via a WLAN link.

Example 94 includes a product comprising one or more tangible computer-readable storage media comprising computer-executable instructions operable to, when executed by at least one computer processor, enable the at least one computer processor to implement one or more operations at a User Equipment (UE), the operations comprising receiving from a cellular network one or more first downlink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB); receiving via a non-cellular Radio Access Technology (RAT) link one or more second downlink PDCP PDUs of the E-RAB; applying a sequence of a plurality of PDCP procedures to the first downlink PDCP PDUs; and applying no more than a part of the sequence of PDCP procedures, by selecting not to apply one or more of the plurality of PDCP procedures, to the second downlink PDCP PDUs.

Example 95 includes the subject matter of Example 94, and optionally, wherein the sequence of PDCP procedures comprises a deciphering procedure, the operations comprising selecting not to apply the deciphering procedure to the second downlink PDCP PDUs, the first downlink PDCP PDUs comprising encrypted PDCP PDUs, the second downlink PDCP PDUs comprising unencrypted PDCP PDUs.

Example 96 includes the subject matter of Example 94 or 95, and optionally, wherein the operations comprise receiving a first PDCP PDU of the first downlink PDCP PDUs processed by the one or more of the plurality of PDCP procedures, receiving a second PDCP PDU of the second downlink PDCP PDUs, which is not processed by the one or more of the plurality of PDCP procedures, and outputting the first and second PDCP PDUs according to a reordering scheme.

Example 97 includes the subject matter of Example 96, and optionally, wherein the operations comprise outputting the first and second PDCP PDUs to a PDCP procedure above the one or more of the plurality of PDCP procedures.

Example 98 includes the subject matter of Example 96 or 97, and optionally, wherein the operations comprise reordering the first and second PDCP PDUs according to a first Link-Aggregation Sequence Number (LA-SN) in a PDCP header of the first PDCP PDU and a second LA-SN in a header of the second PDCP PDU.

Example 99 includes the subject matter of any one of Examples 96-98, and optionally, wherein the operations comprise decapsulating the second PDCP PDU from a tunneling packet received via the non-cellular RAT link.

Example 100 includes the subject matter of any one of Examples 94-99, and optionally, wherein the operations comprise determining the one or more PDCP procedures, which are not to be applied to the second downlink PDCP PDUs, based on an indication in a Radio Resource Control (RRC) message received from the cellular network.

Example 101 includes the subject matter of any one of Examples 94-100, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 102 includes the subject matter of any one of Examples 94-101, and optionally, wherein the operations comprise determining the one or more of the plurality of PDCP procedures, which are not to be applied to the one or more second downlink PDUs, based on a Radio Resource Control (RRC) message received from the cellular network.

Example 103 includes the subject matter of any one of Examples 94-102, and optionally, wherein the non-cellular RAT link comprises a Wireless Local Area Network (WLAN) link.

Example 104 includes a product comprising one or more tangible computer-readable storage media comprising computer-executable instructions operable to, when executed by at least one computer processor, enable the at least one computer processor to implement one or more operations at an evolved Node B (eNB), the operations comprising receiving from a User Equipment (UE) one or more first uplink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearers (E-RAB); receiving via a non-cellular Radio Access Technology (RAT) link one or more second uplink PDCP PDUs of the E-RAB; applying a sequence of a plurality of PDCP procedures to the first uplink PDCP PDUs; and applying no more than a part of the sequence of PDCP procedures, by selecting not to apply one or more of the plurality of PDCP procedures, to the second uplink PDCP PDUs.

Example 105 includes the subject matter of Example 104, and optionally, wherein the sequence of PDCP procedures comprises a deciphering procedure, the operations comprising selecting not to apply the deciphering procedure to the second uplink PDCP PDUs, the first uplink PDCP PDUs comprising encrypted PDCP PDUs, the second uplink PDCP PDUs comprising unencrypted PDCP PDUs.

Example 106 includes the subject matter of Example 104 or 105, and optionally, wherein the operations comprise receiving a first PDCP PDU of the first uplink PDCP PDUs processed by the one or more of the plurality of PDCP procedures, receiving a second PDCP PDU of the second uplink PDCP PDUs, which is not processed by the one or more of the plurality of PDCP procedures, and outputting the first and second PDCP PDUs according to a reordering scheme.

Example 107 includes the subject matter of Example 106, and optionally, wherein the operations comprise outputting the first and second PDCP PDUs to a PDCP procedure above the one or more of the plurality of PDCP procedures.

Example 108 includes the subject matter of Example 106 or 107, and optionally, wherein the operations comprise reordering the first and second PDCP PDUs according to a first Link-Aggregation Sequence Number (LA-SN) in a PDCP header of the first PDCP PDU and a second LA-SN in a header of the second PDCP PDU.

Example 109 includes the subject matter of any one of Examples 106-108, and optionally, wherein the operations comprise decapsulating the second PDCP PDU from a tunneling packet received via the non-cellular RAT link.

Example 110 includes the subject matter of any one of Examples 104-109, and optionally, wherein the operations comprise sending to the UE a Radio Resource Control (RRC) message comprising an indication of the one or more PDCP procedures, which are not to be applied to the one or more second uplink PDUs.

Example 111 includes the subject matter of any one of Examples 104-110, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 112 includes the subject matter of any one of Examples 104-111, and optionally, wherein the non-cellular RAT link comprises a Wireless Local Area Network (WLAN) link.

Example 113 includes a product comprising one or more tangible computer-readable storage media comprising computer-executable instructions operable to, when executed by at least one computer processor, enable the at least one computer processor to implement one or more operations at a User Equipment (UE), the operations comprising communicating with an Evolved Node B (eNB) via a cellular link; communicating over a non-cellular Radio Access Technology (RAT) link; processing a plurality of uplink Protocol Data Units (PDUs) of an Evolved Universal Mobile Telecommunications System (UMTS) Terrestrial Radio Access Network (E-UTRAN) Radio Access Bearer (E-RAB); applying a sequence of a plurality of Packet Data Convergence Protocol (PDCP) procedures to one or more first uplink PDUs to be transmitted to the eNB via the cellular link; and applying no more than a part of the sequence of PDCP procedures, by selecting not to apply one or more of the plurality of PDCP procedures, to one or more second uplink PDUs to be sent to the eNB via the non-cellular RAT link.

Example 114 includes the subject matter of Example 113, and optionally, wherein the sequence of PDCP procedures comprises a ciphering procedure, the operations comprising selecting not to apply the ciphering procedure to the second uplink PDUs, generating one or more encrypted PDCP PDUs based on the one or more first uplink PDUs, and generating one or more unencrypted PDCP PDUs based on the one or more second uplink PDUs.

Example 115 includes the subject matter of Example 113 or 114, and optionally, wherein the operations comprise receiving a PDU of the plurality of uplink PDUs before a PDCP procedure of the plurality of PDCP procedures, transferring the PDU to be processed by the PDCP procedure, if the PDU is to be transmitted via the cellular link, or providing a PDCP PDU, which is not processed by the PDCP procedure, if the PDU is to be transmitted via the non-cellular RAT link.

Example 116 includes the subject matter of Example 115, and optionally, wherein the operations comprise generating the PDCP PDU comprising a Link-Aggregation Sequence Number (LA-SN) in a PDCP header of the PDCP PDU.

Example 117 includes the subject matter of Example 115 or 116, and optionally, wherein the operations comprise encapsulating the PDCP PDU in a tunneling packet to be tunneled via the non-cellular RAT link.

Example 118 includes the subject matter of any one of Examples 113-117, and optionally, wherein the operations comprise generating a plurality of PDCP PDUs corresponding to the plurality of uplink PDUs, a header of a PDCP PDU of the plurality of PDCP PDUs comprising a Link-Aggregation Sequence Number (LA-SN).

Example 119 includes the subject matter of any one of Examples 113-118, and optionally, wherein the operations comprise determining the one or more PDCP procedures, which are not to be applied to the to the second uplink PDCP PDUs, based on an indication in a Radio Resource Control (RRC) message received via the cellular link.

Example 120 includes the subject matter of any one of Examples 113-119, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 121 includes the subject matter of any one of Examples 113-120, and optionally, wherein the non-cellular RAT link comprises a Wireless Local Area Network (WLAN) link.

Example 122 includes an apparatus of cellular communication, the apparatus comprising means for communicating with a User Equipment (UE) via a cellular link; means for processing a plurality of downlink Protocol Data Units (PDUs) of an Evolved Universal Mobile Telecommunications System (UMTS) Terrestrial Radio Access Network (E-UTRAN) Radio Access Bearer (E-RAB); means for applying a sequence of a plurality of Packet Data Convergence Protocol (PDCP) procedures to one or more first downlink PDUs to be transmitted to the UE via the cellular link; and means for applying no more than a part of the sequence of PDCP procedures, by selecting not to apply one or more of the plurality of PDCP procedures, to one or more second downlink PDUs to be transmitted to the UE via a non-cellular Radio Access Technology (RAT).

Example 123 includes the subject matter of Example 122, and optionally, wherein the sequence of PDCP procedures comprises a ciphering procedure, the apparatus comprising means for selecting not to apply the ciphering procedure to the second downlink PDUs, generating one or more encrypted PDCP PDUs based on the one or more first downlink PDUs, and generating one or more unencrypted PDCP PDUs based on the one or more second downlink PDUs.

Example 124 includes the subject matter of Example 122 or 123, and optionally, comprising means for receiving a PDU of the plurality of downlink PDUs before a PDCP procedure of the plurality of PDCP procedures, transferring the PDU to be processed by the PDCP procedure, if the PDU is to be transmitted via the cellular link, or providing a PDCP PDU, which is not processed by the PDCP procedure, if the PDU is to be transmitted via the non-cellular RAT.

Example 125 includes the subject matter of Example 124, and optionally, comprising means for generating the PDCP PDU comprising a Link-Aggregation Sequence Number (LA-SN) in a PDCP header of the PDCP PDU.

Example 126 includes the subject matter of Example 124 or 125, and optionally, comprising means for encapsulating the PDCP PDU in a tunneling packet to be tunneled via a link of the non-cellular RAT.

Example 127 includes the subject matter of any one of Examples 122-126, and optionally, comprising means for generating a plurality of PDCP PDUs corresponding to the plurality of downlink PDUs, a header of a PDCP PDU of the plurality of PDCP PDUs comprising a Link-Aggregation Sequence Number (LA-SN).

Example 128 includes the subject matter of any one of Examples 122-127, and optionally, comprising means for sending to the UE a Radio Resource Control (RRC) message comprising an indication of the one or more PDCP procedures, which are not to be applied to the one or more second downlink PDUs.

Example 129 includes the subject matter of any one of Examples 122-128, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 130 includes the subject matter of any one of Examples 122-129, and optionally, wherein the non-cellular RAT comprises a Wireless Local Area Network (WLAN).

Example 131 includes the subject matter of Example 130, and optionally, comprising means for sending the second downlink PDUs to a WT node.

Example 132 includes the subject matter of Example 130, and optionally, comprising means for sending the second downlink PDUs to the UE via a WLAN link.

Example 133 includes an apparatus of cellular communication, the apparatus comprising means for receiving from a cellular network one or more first downlink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB); means for receiving via a non-cellular Radio Access Technology (RAT) link one or more second downlink PDCP PDUs of the E-RAB; and means for applying a sequence of a plurality of PDCP procedures to the first downlink PDCP PDUs; and means for applying no more than a part of the sequence of PDCP procedures, by selecting not to apply one or more of the plurality of PDCP procedures, to the second downlink PDCP PDUs.

Example 134 includes the subject matter of Example 133, and optionally, wherein the sequence of PDCP procedures comprises a deciphering procedure, the apparatus comprising means for selecting not to apply the deciphering procedure to the second downlink PDCP PDUs, the first downlink PDCP PDUs comprising encrypted PDCP PDUs, the second downlink PDCP PDUs comprising unencrypted PDCP PDUs.

Example 135 includes the subject matter of Example 133 or 134, and optionally, comprising means for receiving a first PDCP PDU of the first downlink PDCP PDUs processed by the one or more of the plurality of PDCP procedures, receiving a second PDCP PDU of the second downlink PDCP PDUs, which is not processed by the one or more of the plurality of PDCP procedures, and outputting the first and second PDCP PDUs according to a reordering scheme.

Example 136 includes the subject matter of Example 135, and optionally, comprising means for outputting the first and second PDCP PDUs to a PDCP procedure above the one or more of the plurality of PDCP procedures.

Example 137 includes the subject matter of Example 135 or 136, and optionally, comprising means for reordering the first and second PDCP PDUs according to a first Link-Aggregation Sequence Number (LA-SN) in a PDCP header of the first PDCP PDU and a second LA-SN in a header of the second PDCP PDU.

Example 138 includes the subject matter of any one of Examples 135-137, and optionally, comprising means for decapsulating the second PDCP PDU from a tunneling packet received via the non-cellular RAT link.

Example 139 includes the subject matter of any one of Examples 133-138, and optionally, comprising means for determining the one or more PDCP procedures, which are not to be applied to the second downlink PDCP PDUs, based on an indication in a Radio Resource Control (RRC) message received from the cellular network.

Example 140 includes the subject matter of any one of Examples 133-139, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 141 includes the subject matter of any one of Examples 133-140, and optionally, comprising means for determining the one or more of the plurality of PDCP procedures, which are not to be applied to the one or more second downlink PDUs, based on a Radio Resource Control (RRC) message received from the cellular network.

Example 142 includes the subject matter of any one of Examples 133-141, and optionally, wherein the non-cellular RAT link comprises a Wireless Local Area Network (WLAN) link.

Example 143 includes an apparatus of cellular communication, the apparatus comprising means for receiving from a User Equipment (UE) one or more first uplink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearers (E-RAB); means for receiving via a non-cellular Radio Access Technology (RAT) link one or more second uplink PDCP PDUs of the E-RAB; means for applying a sequence of a plurality of PDCP procedures to the first uplink PDCP PDUs; and means for applying no more than a part of the sequence of PDCP procedures, by selecting not to apply one or more of the plurality of PDCP procedures, to the second uplink PDCP PDUs.

Example 144 includes the subject matter of Example 143, and optionally, wherein the sequence of PDCP procedures comprises a deciphering procedure, the apparatus comprising means for selecting not to apply the deciphering procedure to the second uplink PDCP PDUs, the first uplink PDCP PDUs comprising encrypted PDCP PDUs, the second uplink PDCP PDUs comprising unencrypted PDCP PDUs.

Example 145 includes the subject matter of Example 143 or 144, and optionally, comprising means for receiving a first PDCP PDU of the first uplink PDCP PDUs processed by the one or more of the plurality of PDCP procedures, receiving a second PDCP PDU of the second uplink PDCP PDUs, which is not processed by the one or more of the plurality of PDCP procedures, and outputting the first and second PDCP PDUs according to a reordering scheme.

Example 146 includes the subject matter of Example 145, and optionally, comprising means for outputting the first and second PDCP PDUs to a PDCP procedure above the one or more of the plurality of PDCP procedures.

Example 147 includes the subject matter of Example 145 or 146, and optionally, comprising means for reordering the first and second PDCP PDUs according to a first Link-Aggregation Sequence Number (LA-SN) in a PDCP header of the first PDCP PDU and a second LA-SN in a header of the second PDCP PDU.

Example 148 includes the subject matter of any one of Examples 145-147, and optionally, comprising means for decapsulating the second PDCP PDU from a tunneling packet received via the non-cellular RAT link.

Example 149 includes the subject matter of any one of Examples 143-148, and optionally, comprising means for sending to the UE a Radio Resource Control (RRC) message comprising an indication of the one or more PDCP procedures, which are not to be applied to the one or more second uplink PDUs.

Example 150 includes the subject matter of any one of Examples 143-149, and optionally, wherein the sequence of PDCP procedures comprises one or more procedures selected from the group consisting of a header removal procedure, a deciphering procedure, an integrity verification procedure, a header decompression procedure, and an in order delivery procedure.

Example 151 includes the subject matter of any one of Examples 143-150, and optionally, wherein the non-cellular RAT link comprises a Wireless Local Area Network (WLAN) link.

Example 152 includes an apparatus of cellular communication, the apparatus comprising means for communicating with an Evolved Node B (eNB) via a cellular link; means for communicating over a non-cellular Radio Access Technology (RAT) link; means for processing a plurality of uplink Protocol Data Units (PDUs) of an Evolved Universal Mobile Telecommunications System (UMTS) Terrestrial Radio Access Network (E-UTRAN) Radio Access Bearer (E-RAB); means for applying a sequence of a plurality of Packet Data Convergence Protocol (PDCP) procedures to one or more first uplink PDUs to be transmitted to the eNB via the cellular link; and means for applying no more than a part of the sequence of PDCP procedures, by selecting not to apply one or more of the plurality of PDCP procedures, to one or more second uplink PDUs to be sent to the eNB via the non-cellular RAT link.

Example 153 includes the subject matter of Example 152, and optionally, wherein the sequence of PDCP procedures comprises a ciphering procedure, the apparatus comprising means for selecting not to apply the ciphering procedure to the second uplink PDUs, generating one or more encrypted PDCP PDUs based on the one or more first uplink PDUs, and generating one or more unencrypted PDCP PDUs based on the one or more second uplink PDUs.

Example 154 includes the subject matter of Example 152 or 153, and optionally, comprising means for receiving a PDU of the plurality of uplink PDUs before a PDCP procedure of the plurality of PDCP procedures, transferring the PDU to be processed by the PDCP procedure, if the PDU is to be transmitted via the cellular link, or providing a PDCP PDU, which is not processed by the PDCP procedure, if the PDU is to be transmitted via the non-cellular RAT link.

Example 155 includes the subject matter of Example 154, and optionally, comprising means for generating the PDCP PDU comprising a Link-Aggregation Sequence Number (LA-SN) in a PDCP header of the PDCP PDU.

Example 156 includes the subject matter of Example 154 or 155, and optionally, comprising means for encapsulating the PDCP PDU in a tunneling packet to be tunneled via the non-cellular RAT link.

Example 157 includes the subject matter of any one of Examples 152-156, and optionally, comprising means for generating a plurality of PDCP PDUs corresponding to the plurality of uplink PDUs, a header of a PDCP PDU of the plurality of PDCP PDUs comprising a Link-Aggregation Sequence Number (LA-SN).

Example 158 includes the subject matter of any one of Examples 152-157, and optionally, comprising means for determining the one or more PDCP procedures, which are not to be applied to the to the second uplink PDCP PDUs, based on an indication in a Radio Resource Control (RRC) message received via the cellular link.

Example 159 includes the subject matter of any one of Examples 152-158, and optionally, wherein the sequence of PDCP procedures comprises one or more procedures selected from the group consisting of a sequence numbering procedure, a header compression procedure, an integrity protection procedure, a ciphering procedure, and a PDCP header addition procedure.

Example 160 includes the subject matter of any one of Examples 152-159, and optionally, wherein the non-cellular RAT link comprises a Wireless Local Area Network (WLAN) link.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of an evolved Node B (eNB), the apparatus comprising:
   an air interface to communicate with a User Equipment (UE) via a cellular link; and
   a Packet Data Convergence Protocol (PDCP) processor configured to process a plurality of downlink Protocol Data Units (PDUs) of an Evolved Universal Mobile Telecommunications System (UMTS) Terrestrial Radio Access Network (E-UTRAN) Radio Access Bearer (E-RAB), the PDCP processor configured to apply a sequence of a plurality of PDCP procedures to one or more first downlink PDUs to be transmitted to the UE via the cellular link, and to apply no more than a part of the sequence of PDCP procedures, by selecting not to apply one or more of the plurality of PDCP procedures, to one or more second downlink PDUs to be transmitted to the UE via a non-cellular Radio Access Technology (RAT), the PDCP processor configured to generate a plurality of PDCP PDUs corresponding to the plurality of downlink PDUs.

2. The apparatus of claim 1, wherein the sequence of PDCP procedures comprises a ciphering procedure, the PDCP processor configured to select not to apply the ciphering procedure to the second downlink PDUs, the PDCP processor configured to generate one or more encrypted PDCP PDUs based on the one or more first downlink PDUs, and to generate one or more unencrypted PDCP PDUs based on the one or more second downlink PDUs.

3. The apparatus of claim 1, wherein the PDCP processor comprises a link aggregation processor configured to receive a PDU of the plurality of downlink PDUs before a PDCP procedure of the plurality of PDCP procedures, the link aggregation processor configured to transfer the PDU to be processed by the PDCP procedure, when the PDU is to be transmitted via the cellular link, or to provide a PDCP PDU, which is not processed by the PDCP procedure, when the PDU is to be transmitted via the non-cellular RAT.

4. The apparatus of claim 3, wherein the link aggregation processor is configured to generate the PDCP PDU comprising a Link-Aggregation Sequence Number (LA-SN) in a PDCP header of the PDCP PDU.

5. The apparatus of claim 3 comprising an adaptation processor configured to encapsulate the PDCP PDU in a tunneling packet to be tunneled via a link of the non-cellular RAT.

6. The apparatus of claim 1, wherein a header of a PDCP PDU of said plurality of PDCP PDUs comprises a Link-Aggregation Sequence Number (LA-SN).

7. The apparatus of claim 1, wherein the air interface is configured to send to the UE a Radio Resource Control (RRC) message comprising an indication of the one or more PDCP procedures, which are not to be applied to the one or more second downlink PDUs.

8. The apparatus of claim 1, wherein the sequence of PDCP procedures comprises one or more procedures selected from the group consisting of a sequence numbering procedure, a header compression procedure, an integrity protection procedure, a ciphering procedure, and a PDCP header addition procedure.

9. The apparatus of claim 1, wherein the non-cellular RAT comprises a Wireless Local Area Network (WLAN).

10. The apparatus of claim 1 comprising a plurality of antennas, a memory, and a processor.

11. An apparatus of a User Equipment (UE), the apparatus comprising:
a cellular transceiver to receive from a cellular network one or more first downlink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB);
a non-cellular Radio Access Technology (RAT) transceiver to receive via a non-cellular RAT link one or more packets comprising second downlink PDCP PDUs of the E-RAB; and
a PDCP processor configured to decapsulate the second downlink PDCP PDUs from the one or more packets, to apply a sequence of a plurality of PDCP procedures to the first downlink PDCP PDUs, and to apply no more than a part of the sequence of PDCP procedures, by selecting not to apply one or more of the plurality of PDCP procedures, to the second downlink PDCP PDUs.

12. The apparatus of claim 11, wherein the sequence of PDCP procedures comprises a deciphering procedure, the PDCP processor configured to select not to apply the deciphering procedure to the second downlink PDCP PDUs, the first downlink PDCP PDUs comprising encrypted PDCP PDUs, the second downlink PDCP PDUs comprising unencrypted PDCP PDUs.

13. The apparatus of claim 11, wherein the PDCP processor comprises a link aggregation processor configured to receive a first PDCP PDU of the first downlink PDCP PDUs processed by the one or more of the plurality of PDCP procedures, to receive a second PDCP PDU of the second downlink PDCP PDUs, which is not processed by the one or more of the plurality of PDCP procedures, and to output the first and second PDCP PDUs according to a reordering scheme.

14. The apparatus of claim 13, wherein the link aggregation processor is configured to output the first and second PDCP PDUs to a PDCP procedure above the one or more of the plurality of PDCP procedures.

15. The apparatus of claim 13, wherein the link aggregation processor is configured to reorder the first and second PDCP PDUs according to a first Link-Aggregation Sequence Number (LA-SN) in a PDCP header of the first PDCP PDU and a second LA-SN in a header of the second PDCP PDU.

16. The apparatus of claim 13 comprising an adaptation processor configured to decapsulate the second PDCP PDU from a tunneling packet received via the non-cellular RAT link.

17. The apparatus of claim 11, wherein the PDCP processor is configured to determine the one or more PDCP procedures, which are not to be applied to the second downlink PDCP PDUs, based on an indication in a Radio Resource Control (RRC) message received by the cellular transceiver.

18. The apparatus of claim 11, wherein the non-cellular RAT link comprises a Wireless Local Area Network (WLAN) link.

19. The apparatus of claim 11 comprising:
one or more antennas;
a memory; and
a processor.

20. A product comprising one or more computer-readable non-transitory storage media comprising computer-executable instructions operable to, when executed by at least one processor, enable the at least one processor to cause an evolved Node B (eNB) to:
receive from a User Equipment (UE) one or more first uplink Packet Data Convergence Protocol (PDCP) Protocol Data Units (PDUs) of an Evolved Universal Mobile Telecommunications System (UMTS) Terrestrial Radio Access Network (E-UTRAN) Radio Access Bearer (E-RAB);
receive via a non-cellular Radio Access Technology (RAT) link one or more packets comprising second uplink PDCP PDUs of the E-RAB;
decapsulate the second uplink PDCP PDUs from the one or more packets;
apply a sequence of a plurality of PDCP procedures to the first uplink PDCP PDUs; and
apply no more than a part of the sequence of PDCP procedures, by selecting not to apply one or more of the plurality of PDCP procedures, to the second uplink PDCP PDUs.

21. The product of claim 20, wherein the sequence of PDCP procedures comprises a deciphering procedure, the instructions, when executed, cause the eNB to select not to apply the deciphering procedure to the second uplink PDCP PDUs, the first uplink PDCP PDUs comprising encrypted PDCP PDUs, the second uplink PDCP PDUs comprising unencrypted PDCP PDUs.

22. The product of claim 20, wherein the instructions, when executed, cause the eNB to receive a first PDCP PDU of the first uplink PDCP PDUs processed by the one or more of the plurality of PDCP procedures, receive a second PDCP PDU of the second uplink PDCP PDUs, which is not processed by the one or more of the plurality of PDCP procedures, and output the first and second PDCP PDUs according to a reordering scheme.

23. A product comprising one or more computer-readable non-transitory storage media comprising computer-executable instructions operable to, when executed by at least one processor, enable the at least one processor to cause a User Equipment (UE) to:
communicate with an Evolved Node B (eNB) via a cellular link;
communicate over a non-cellular Radio Access Technology (RAT) link;
process a plurality of uplink Protocol Data Units (PDUs) of an Evolved Universal Mobile Telecommunications System (UMTS) Terrestrial Radio Access Network (E-UTRAN) Radio Access Bearer (E-RAB);
apply a sequence of a plurality of Packet Data Convergence Protocol (PDCP) procedures to one or more first uplink PDUs to be transmitted to the eNB via the cellular link;
apply no more than a part of the sequence of PDCP procedures, by selecting not to apply one or more of the plurality of PDCP procedures, to one or more second uplink PDUs to be sent to the eNB via the non-cellular RAT link; and
generate a plurality of PDCP PDUs corresponding to the plurality of uplink PDUs.

24. The product of claim 23, wherein the instructions, when executed, cause the UE to receive a PDU of the plurality of uplink PDUs before a PDCP procedure of the plurality of PDCP procedures, transfer the PDU to be processed by the PDCP procedure, when the PDU is to be transmitted via the cellular link, or provide a PDCP PDU, which is not processed by the PDCP procedure, when the PDU is to be transmitted via the non-cellular RAT link.

25. The product of claim 23, wherein a header of a PDCP PDU of said plurality of PDCP PDUs comprises a Link-Aggregation Sequence Number (LA-SN).

* * * * *